US011106320B2

(12) United States Patent
Toyooka et al.

(10) Patent No.: US 11,106,320 B2
(45) Date of Patent: *Aug. 31, 2021

(54) TOUCH SENSOR, METHOD FOR MANUFACTURING TOUCH SENSOR, AND IMAGE DISPLAY DEVICE

(71) Applicant: FUJIFILM Corporation, Tokyo (JP)

(72) Inventors: Kentaro Toyooka, Fujinomiya (JP); Yohei Aritoshi, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,512

(22) Filed: Feb. 13, 2020

(65) Prior Publication Data

US 2020/0183541 A1 Jun. 11, 2020

Related U.S. Application Data

(63) Continuation of application No. PCT/JP2018/032098, filed on Aug. 30, 2018.

(30) Foreign Application Priority Data

Sep. 29, 2017 (JP) .............................. JP2017-191372

(51) Int. Cl.
*G06F 3/044* (2006.01)
*G06F 3/041* (2006.01)

(52) U.S. Cl.
CPC .......... *G06F 3/0443* (2019.05); *G06F 3/0412* (2013.01); *G06F 3/0418* (2013.01);
(Continued)

(58) Field of Classification Search
CPC .... G06F 3/0043; G06F 3/0446; G06F 3/0448; G06F 3/0412; G06F 2203/04103; G06F 2203/04111; G06F 3/0418; B32B 27/20
(Continued)

(56) References Cited

U.S. PATENT DOCUMENTS

2012/0113021 A1 5/2012 Liu et al.
2014/0022467 A1 1/2014 Chai et al.
(Continued)

FOREIGN PATENT DOCUMENTS

JP 2013-206197 A 10/2013
JP 2013-546075 A 12/2013
(Continued)

OTHER PUBLICATIONS

International Search Report dated Nov. 13, 2018, issued by the International Searching Authority in application No. PCT/JP2018/032098.
(Continued)

*Primary Examiner* — Abdul-Samad A Adediran
(74) *Attorney, Agent, or Firm* — Sughrue Mion, PLLC

(57) ABSTRACT

A touch sensor includes a first electrode pattern and a second electrode pattern respectively extending in mutually intersecting directions on the same surface of a transparent base material, in which the second electrode pattern has a plurality of second island-shaped electrode portions disposed at intervals in a second direction intersecting the first direction and second wire portions that build bridges and electrically connect the second island-shaped electrode portions adjacent to each other on the transparent base material, and a third transparent layer having a refractive index p of 1.5 or higher and a thickness of 300 nm or less and a fourth transparent layer having a refractive index lower than the refractive index p and a thickness of 0.5 μm or more are provided in this order on the second wire portion, a method for manufacturing the same, and an image display device.

18 Claims, 3 Drawing Sheets

(52) U.S. Cl.
CPC .......... *G06F 3/0446* (2019.05); *G06F 3/0448* (2019.05); *G06F 2203/04103* (2013.01); *G06F 2203/04111* (2013.01)

(58) Field of Classification Search
USPC ........................................................ 428/334
See application file for complete search history.

(56) References Cited

U.S. PATENT DOCUMENTS

| | | | |
|---|---|---|---|
| 2015/0109252 A1 | 4/2015 | Kanna et al. | |
| 2015/0169107 A1 | 6/2015 | Misaki | |
| 2015/0251393 A1* | 9/2015 | Kanna | B32B 27/20 428/334 |
| 2019/0384428 A1* | 12/2019 | Ahn | G06F 3/0418 |

FOREIGN PATENT DOCUMENTS

| | | |
|---|---|---|
| JP | 2014-010814 A | 1/2014 |
| JP | 2014-503102 A | 2/2014 |
| JP | 2015-529899 A | 10/2015 |
| JP | 2016-506574 A | 3/2016 |
| WO | 2014/007157 A1 | 1/2014 |

OTHER PUBLICATIONS

Written Opinion dated Nov. 13, 2018, issued by the International Searching Authority in application No. PCT/JP2018/032098.
International Preliminary Report on Patentability dated Mar. 31, 2020, issued by the International Bureau in application No. PCT/JP2018/032098.
Communication dated Mar. 2, 2021 from the Japanese Patent Office in Application No. 2019-544457.

* cited by examiner

TOUCH SENSOR, METHOD FOR MANUFACTURING TOUCH SENSOR, AND IMAGE DISPLAY DEVICE

CROSS-REFERENCE TO RELATED APPLICATIONS

This application is a Continuation of PCT International Application No. PCT/JP2018/032098 filed on Aug. 30, 2018, which claims priority under 35 U.S.C § 119(a) to Japanese Patent Application No. 2017-191372 filed on Sep. 29, 2017. Each of the above application(s) is hereby expressly incorporated by reference, in its entirety, into the present application.

BACKGROUND OF THE INVENTION

1. Field of the Invention

The present disclosure relates to a touch sensor, a method for manufacturing a touch sensor, and an image display device.

2. Description of the Related Art

In recent years, input devices in which information corresponding to command images can be input by touching the command images with a finger, a stylus, or the like (hereinafter, also referred to as touch panels) have been broadly used. As the touch panels, there are resistance film-type devices and electrostatic capacitance-type devices. Electrostatic capacitance-type touch panels have an advantage of being capable of having a simple structure in which a translucent conductive film is formed on a single substrate.

As an example of the electrostatic capacitance-type touch panels, a device in which electrode patterns are respectively extended in mutually intersecting directions and a touch location is detected by sensing a change in electrostatic capacitance caused by a conductor such as a human finger approaching the electrode patterns is known (for example, refer to JP2013-206197A).

At the time of using the electrostatic capacitance-type touch panel, in a case where the surface of the touch panel is observed from, for example, a location slightly away from a location at which light incident from an internal light source is normally reflected, there is a case where the electrode patterns present inside the panel become visible and the appearance is impaired. Therefore, as performance for touch panels, a favorable electrode pattern-covering property is demanded.

As a technique relating to the electrode pattern-covering property, the setting of the refractive index of an insulating body disposed between a first electric wire that electrically connects a plurality of first patterns having a first refractive index and a second electric wire that electrically connects a plurality of second patterns having a second refractive index to be substantially equal to the first refractive index and the second refractive index is disclosed (for example, refer to JP2013-546075A).

In addition, a sensor panel including, on a substrate, a plurality of first sensor electrodes provided along a first direction, a plurality of second sensor electrodes provided along a second direction intersecting the first direction, first bridges coupling the first sensor electrodes adjacent to each other, second bridges coupling the second sensor electrodes adjacent to each other, an insulating layer that electrically separates the first bridges and the second bridges and has a lower refractive index than the second bridge, and an antireflection layer that is provided on the second bridges and includes a first substance layer and a second substance layer having a higher refractive index than the first substance layer is disclosed (for example, refer to JP2015-529899A).

SUMMARY OF THE INVENTION

Among the related arts, in the technique described in JP2013-206197A, bridge wires are installed via an insulating film having a high refractive index that is substantially equal to the refractive index of electrodes, whereby an effect for preventing the pattern of bridge portions from becoming visible is expected. However, the device is formed to have a high refractive index as a whole, which increases the difference in refractive index with a layer having a refractive index of approximately 1.5 which is installed above the device. As a result, there is a problem in that the electrode patterns are easily visible and it is not possible to cover the patterns.

In addition, even the method of setting the refractive index of the insulating body disposed between the first electric wire and the second electric wire to be substantially equal to the refractive index of the first patterns and the refractive index of the second patterns as in JP2013-546075A does not satisfy the electrode pattern-covering property. Furthermore, even in the structure in which the first substance layer and the second substance layer are sequentially disposed as in the sensor panel described in JP2015-529899A, the electrode pattern-covering property lacks, and room for improvement still remains.

The present disclosure has been made in consideration of the above description.

An object that an embodiment of the present invention intends to achieve is to provide a touch sensor which suppresses the reflection of light on a bridge wire and has an excellent covering property for wiring patterns including the bridge wire.

An object that another embodiment of the present invention intends to achieve is to provide a method for manufacturing a touch sensor which suppresses the reflection of light on a bridge wire and has an excellent covering property for wiring patterns including the bridge wire.

An object that still another embodiment of the present invention intends to achieve is to provide an image display device having improved visibility of wiring patterns including a bridge wire.

As specific means for achieving the above-described objects, the following aspects are included.

<1> A touch sensor comprising: a first electrode pattern and a second electrode pattern respectively extending in mutually intersecting directions on the same surface of a transparent base material, in which the first electrode pattern has a plurality of first island-shaped electrode portions disposed at intervals in a first direction on the transparent base material and first wire portions that electrically connect the first island-shaped electrode portions adjacent to each other, the second electrode pattern has a plurality of second island-shaped electrode portions disposed at intervals in a second direction intersecting the first direction and second wire portions that build bridges and electrically connect the second island-shaped electrode portions adjacent to each other on the transparent base material, and a third transparent layer having a refractive index p of 1.5 or higher and a thickness of 300 nm or less and a fourth transparent layer having a refractive index lower than the refractive index p and a thickness of 0.5 µm or more are provided in this order on the second wire portion.

<2> The touch sensor according to <1>, in which the refractive index of the third transparent layer is higher than the refractive index of the fourth transparent layer by 0.01 or more.

<3> The touch sensor according to <1> or <2>, in which the second wire portion is a transparent electrode.

<4> The touch sensor according to any one of <1> to <3>, in which a protective layer is provided on the first electrode pattern and the plurality of second island-shaped portions of the second electrode pattern, and the protective layer has a first transparent layer having a refractive index of 1.6 or higher and a thickness of 200 nm or less and a second transparent layer having a refractive index of less than 1.6 and a thickness of 0.5 µm or more in this order on the first electrode pattern and the second island-shaped electrode portions of the second electrode pattern.

<5> The touch sensor according to <4>, in which the refractive index of the first transparent layer is higher than the refractive index of the second transparent layer by 0.01 or more.

<6> The touch sensor according to <4> or <5>, in which the protective layer has through-holes, and the second wire portions electrically connect the plurality of second island-shaped electrode portions adjacent to each other via the through-holes.

<7> The touch sensor according to any one of <4> to <6>, in which the first transparent layer, the second transparent layer, the third transparent layer, and the fourth transparent layer are transfer layers.

<8> The touch sensor according to any one of <4> to <7>, in which the first transparent layer has a refractive index of 1.6 to 1.9 and a thickness of 20 nm to 200 nm, and the second transparent layer has a refractive index of 1.4 or higher and less than 1.6 and a thickness of 0.5 µm to 20 µm.

<9> The touch sensor according to any one of <4> to <8>, further comprising: a seventh transparent layer having a refractive index of 1.5 or less and a thickness of 200 nm or less between the first transparent layer and the first and second electrode patterns.

<10> The touch sensor according to any one of <1> to <9>, further comprising: a sixth transparent layer having a thickness of 200 nm or less between the second wire portion and the third transparent layer, in which a refractive index of the sixth transparent layer is lower than the refractive index of the third transparent layer.

<11> The touch sensor according to <10>, in which the refractive index p of the sixth transparent layer is 1.6 or less.

<12> The touch sensor according to <11>, in which the third transparent layer has a refractive index of 1.5 to 2.4 and a thickness of 10 nm to 100 nm, the fourth transparent layer has a refractive index of 1.4 to 1.6 and a thickness of 0.5 µm to 20 µm, and the sixth transparent layer has a refractive index of 1.2 to 1.6 and a thickness of 10 nm to 100 nm.

<13> The touch sensor according to any one of <10> to <12>, in which the sixth transparent layer is a transfer layer.

<14> The touch sensor according to any one of <1> to <9>, in which the third transparent layer has a refractive index of 1.5 to 1.75 and a thickness of 20 nm to 300 nm, and the fourth transparent layer has a refractive index of 1.4 to 1.6 and a thickness of 0.5 µm to 20 µm.

<15> The touch sensor according to any one of <1> to <14>, further comprising: a fifth transparent layer having a refractive index of 1.6 or higher and a thickness of 200 nm or less between the transparent base material and the first and second electrode patterns.

<16> A method for manufacturing the touch sensor according to any one of <1> to <15>, comprising:

forming a third transparent layer having a refractive index p of 1.5 or higher and a thickness of 300 nm or less by transferring a transfer layer of a transfer material on a second wire portions in a second electrode pattern of an electrode pattern-attached base material including a first electrode pattern and the second electrode pattern respectively extending in mutually intersecting directions on the same surface of a transparent base material; and forming a fourth transparent layer having a refractive index lower than the refractive index p and a thickness of 0.5 µm or more on the third transparent layer by transferring a transfer layer of a transfer material.

<17> The method for manufacturing the touch sensor according to <16>, further comprising, before the formation of the third transparent layer:

forming a first transparent layer having a refractive index of 1.6 or higher and a thickness of 200 nm or less on the electrode pattern-attached base material by transferring a transfer layer of a transfer material, and forming a second transparent layer having a refractive index of less than 1.6 and a thickness of 0.5 µm or more on the electrode pattern-attached base material by transferring a transfer layer of a transfer material.

<18> The method for manufacturing the touch sensor according to <16> or <17>, further comprising, after the formation of the first transparent layer and the formation of the second transparent layer and before the formation of the third transparent layer:

forming the sixth transparent layer having a thickness of 200 nm or less and a refractive index lower than the refractive index of the third transparent layer on the second wire portion by transferring a transfer layer of a transfer material.

<19> The method for manufacturing the touch sensor according to <18>, in which the refractive index p of the third transparent layer is 1.6 or less.

<20> An image display device comprising: the touch sensor according to any one of <1> to <15>.

According to the embodiment of the present invention, a touch panel which suppresses the reflection of light on a bridge wire and has an excellent covering property for wiring patterns including the bridge wire is provided.

According to another embodiment of the present invention, a method for manufacturing a touch panel which suppresses the reflection of light on a bridge wire and has an excellent covering property for wiring patterns including the bridge wire is provided.

According to still another embodiment of the present invention, an image display device having improved visibility of wiring patterns including a bridge wire is provided.

DESCRIPTION OF THE PREFERRED EMBODIMENTS

Figure 1:
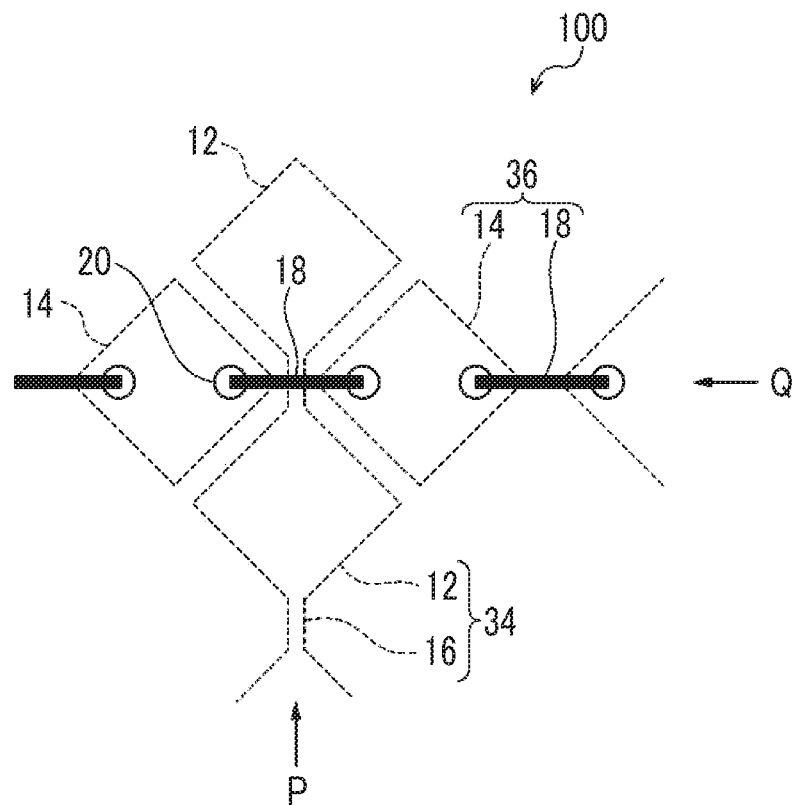
FIG. 1 is a plan view showing a configurational example of an electrode pattern-attached base material of a touch sensor.

Hereinafter, a touch sensor and a method for manufacturing a touch sensor of an embodiment of the present disclosure will be described in detail.

In the present specification, a numerical range expressed using "to" indicates a range including numerical values before and after "to" as the minimum value and the maximum value respectively. In numerical ranges expressed stepwise in the present disclosure, the upper limit value or the lower limit value described in a certain numerical range may be substituted into the upper limit value or the lower limit value of a different numerical range expressed stepwise. In addition, in numerical ranges expressed in the present disclosure, the upper limit value or the lower limit value described in a certain numerical range may be substituted into a value described in an example.

In the present specification, in a case where there is a plurality of substances corresponding to a certain component in a composition, unless particularly otherwise described, the amount of the component in the composition refers to the total amount of the plurality of substances present in the composition.

In addition, the term "step" in the present specification refers not only to an independent step but also a step that cannot be clearly differentiated from other steps as long as the intended purpose of the step is achieved.

In the present specification, "being transparent" means that the average transmittance of visible light having a wavelength of 400 nm to 700 nm is 80% or more. Therefore, for example, a "transparent layer" refers to a layer having an average transmittance of visible light having a wavelength of 400 nm to 700 nm being 80% or more. The average transmittance of visible light of the "transparent layer" is preferably 90% or more.

In addition, the average transmittance of visible light is a value measured using a spectral photometer and can be measured using, for example, a spectral photometer U-3310 manufactured by Hitachi, Ltd.

In the present specification, unless particularly otherwise described, the content ratio of each structural unit of a polymer is a molar ratio.

In addition, in the present specification, the refractive index is a value measured using an ellipsometry at a wavelength of 550 nm unless particularly otherwise described.

<Touch Sensor>

The touch sensor of the embodiment of the present disclosure has a first electrode pattern and a second electrode pattern respectively extending in mutually intersecting directions on the same surface of a transparent base material, and a third transparent layer having a refractive index p of 1.5 or higher and a thickness of 200 nm or less and a fourth transparent layer having a refractive index lower than the refractive index p and a thickness of 0.5 μm or more are provided in this order on a second wire portion in the second electrode pattern.

The first electrode pattern has a plurality of first island-shaped electrode portions disposed at intervals in a first direction on the transparent base material and first wire portions that electrically connect the first island-shaped electrode portions adjacent to each other.

The second electrode pattern has a plurality of second island-shaped electrode portions disposed at intervals in a second direction intersecting the first direction and second wire portions that build bridges and electrically connect the second island-shaped electrode portions adjacent to each other on the transparent base material.

Hitherto, touch sensors in which electrode patterns in each of which a plurality of electrode portions is electrically connected to each other are disposed in two mutually intersecting directions on the same surface of a base material and intersection portions are formed in a bridge structure have been known. In the intersection portions, the electrode pattern tends to be easily visible, and, particularly, a second electrode pattern connected and disposed in one direction so as to build a bridge over a first electrode pattern connected and disposed in the other direction is easily noticeable, which is likely to impair the appearance of the panel.

In a case where the second electrode pattern is a metallic electrode, particularly, the tendency to impair the appearance is strong, and, even in a case where the second electrode pattern is a transparent electrode of a metal oxide (for example, indium tin oxide (ITO) or the like), the visibility of the electrode pattern has been considered to be insufficient. Therefore, for bridge electrode-type touch panels, studies have been conducted to improve the visibility of electrode patterns in intersection portions in which the electrode patterns extending in different directions intersect each other.

However, among the known related arts, in the invention described in JP2013-206197A, bridge wires are installed via an insulating film having a high refractive index that is substantially equal to the refractive index of electrodes, but it cannot be said that the invention is enough in terms of the pattern-covering property. In the invention described in JP2013-546075A, the refractive index of the insulating body between the electrode wires being connected to the first pattern and the second pattern and the refractive index of the respective patterns are set to be substantially equal to each other, but the invention is not enough in terms of the pattern-covering property. In addition, in the invention described in JP2015-529899A a layer having a low refractive index and a layer having a high refractive index are superimposed from a bridge structure side, but a desired pattern-covering property is not obtained.

In consideration of the above description, in the touch sensor of the embodiment of the present disclosure, as described above, in an electrode pattern-attached base material including the first electrode pattern and the second electrode pattern respectively extending in mutually intersecting directions, a high-refractive index layer (third transparent layer) having a refractive index p of 1.5 or higher and a thickness of 300 nm or less is disposed on the second wire portion in the second electrode pattern, which builds a bridge between the second island-shaped electrode portions adjacent to each other so as to extend across the first electrode pattern, and, furthermore, a low-refractive index layer (fourth transparent layer) having a refractive index lower than that of the high-refractive index layer and a thickness of 0.5 μm or more is superimposed on the high-refractive index layer, whereby the covering property for the electrode patterns, particularly, bridge wires further improves, and the visibility is effectively improved.

An embodiment of the touch sensor of the embodiment of the present disclosure will be described with reference to FIG. 1 to FIG. 3.

FIG. 1 is a plan view showing a part of the touch sensor and showing a configurational example of the electrode pattern-attached base material of the touch sensor. In addition, FIG. 2 is a plan view showing an example of the touch sensor in a state in which a covering layer is provided on the second wire portion (bridge wire) and the first wire portion and the second wire portion are not visible, and FIG. 3 is a cross-sectional view in a direction of an A-A line in FIG. 2.

A touch sensor 100 that is an embodiment of the present disclosure, first, includes an electrode pattern-attached base material in which a first electrode pattern 34 and a second electrode pattern 36 respectively extending in a direction of an arrow P or a direction of an arrow Q that intersect each other are disposed on a transparent base material 10 as shown in FIG. 1.

On the electrode pattern-attached base material, a plurality of first island-shaped electrode portions 12 is arranged across a broad range of the transparent base material, and the plurality of first island-shaped electrode portions 12 arranged in one direction (first direction P) extends by being connected to each other by first wire portions 16, whereby the extending first electrode pattern 34 is disposed. Therefore, a long electrode is formed in one direction on a surface of the transparent base material.

Furthermore, on the transparent base material on which the first electrode pattern 34 is disposed, a plurality of second island-shaped electrode portions 14 is arranged across a broad range of the transparent base material in the other direction (second direction Q) intersecting the first direction, the second island-shaped electrode portions 14 adjacent to each other are connected to each other by building second wire portions 18 as bridges, whereby the extending second electrode pattern 36 is disposed. Therefore, a long electrode is formed in the other direction intersecting the first electrode pattern on the surface of the transparent base material.

Figure 2:
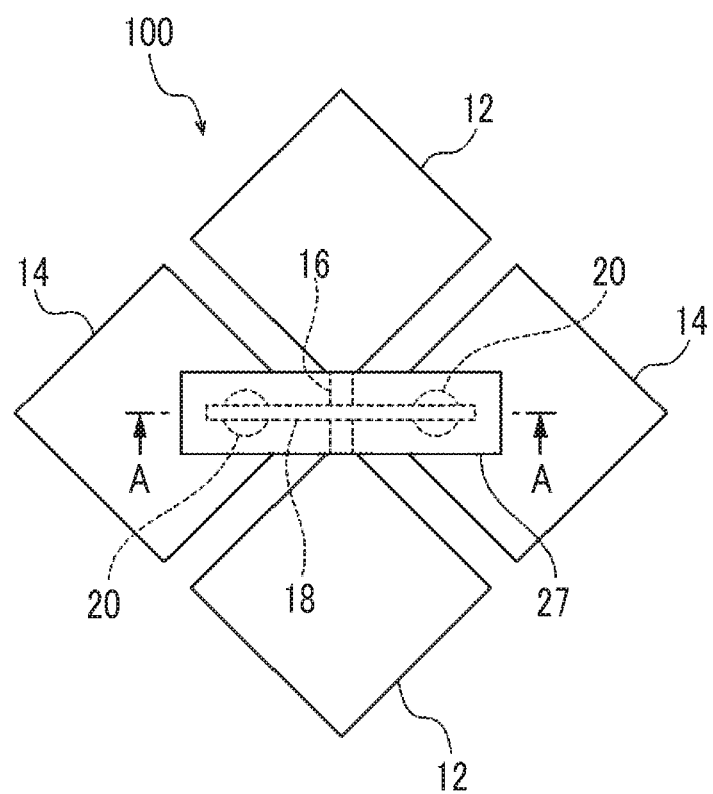
FIG. 2 is a plan view showing an embodiment of the touch sensor in a state in which a covering layer is provided on a bridge wire and an electrode pattern is not easily visible.

Next, in a region having the first wire portion 16 and the second wire portion (bridge wire) 18 intersecting the first wire portion 16 on the electrode pattern-attached base material, as shown in FIG. 2, a covering layer 27 is disposed. The covering layer 27 is disposed so as to cover the first wire portion 16 and the second wire portion 18, whereby the first wire portion 16 and the second wire portion 18 are covered with the covering layer 27, and a structure in which the wire portions cannot be viewed from above the electrode pattern-attached base material is formed.

To the second island-shaped electrode portions 14, the bridge wire 18 is connected via through-holes 20.

Figure 3:
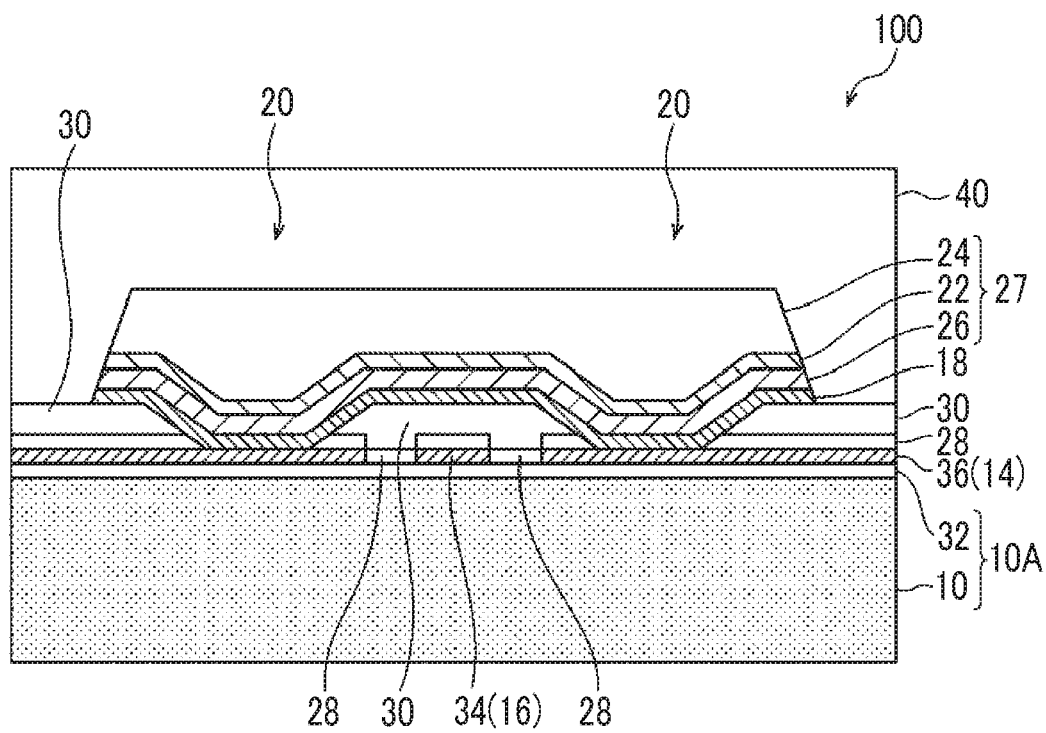
FIG. 3 is a cross-sectional view in a direction of an A-A line in FIG. 2.

A cross-sectional view of the touch sensor in the case of being cut along an A-A line in FIG. 2 is shown in FIG. 3. FIG. 3 is a schematic cross-sectional view showing a configurational example of the touch sensor.

The touch sensor 100 that is an embodiment of the present disclosure has a structure in which the electrode pattern-attached base material is provided by, as shown in FIG. 3, including the transparent base material 10 and having the first electrode pattern 34 and the second electrode pattern 36 (hereinafter, both will be collectively referred to simply as "electrode patterns" in some cases) on the transparent base material 10.

The first electrode pattern 34 and the second electrode pattern 36 on the electrode pattern-attached base material form a bridge structure in which, as shown in FIG. 3, in an intersection portion, one of intersecting electrodes overlaps the other, and both electrodes are not electrically connected to each other in the structure.

The first electrode pattern 34 has the plurality of first island-shaped electrode portions 12 disposed at intervals in the first direction on the transparent base material 10 and the first wire portions 16 that electrically connect the first island-shaped electrode portions adjacent to each other.

The refractive indexes of the first island-shaped electrode portion 12 and the first wire portion 16 are preferably in a range of 1.75 to 2.1.

A material of the first island-shaped electrode portion 12 is not particularly limited, but needs to be a material capable of forming a transparent conductive film, and a well-known material can be used. As specific materials, for example, metal oxides such as indium tin oxide (ITO), aluminum-doped zinc oxide (AZO), and indium zinc oxide (IZO) are exemplified.

As the first island-shaped electrode portion 12, it is possible to use, for example, a translucent metal oxide film such as an ITO film, an IZO film, or a $SiO_2$ film; a metal film of Al, Zn, Cu, Fe, Ni, Cr, Mo, Ag, Au, or the like; an alloy film of a plurality of metals such as a copper-nickel alloy; or the like.

The thickness of the first island-shaped electrode portion 12 can be set to 10 nm to 200 nm.

In addition, an amorphous ITO film may be transformed to a polycrystalline ITO film by firing. In the case of forming a conductive pattern using an ITO film or the like, it is possible to refer to the description of Paragraphs 0014 to 0016 of JP4506785B.

The shape of the first island-shaped electrode portion 12 is not particularly limited and may be any of a square shape, a rectangular shape, a rhombic shape, a trapezoidal shape, a pentagonal or higher polygonal shape, or the like, but a square shape, a rhombic shape, or a hexagonal shape is preferred since a fine packed structure is easily formed.

The first wire portion 16 is not particularly limited as long as the first wire portion is a member capable of electrically connecting the first island-shaped electrode portions 12 adjacent to each other. To the first wire portion 16, it is possible to apply the same material as the first island-shaped electrode portion 12, and the thickness is also the same. In addition, an amorphous ITO film may be transformed to a polycrystalline ITO film by firing.

The second electrode pattern 36 has a plurality of second island-shaped electrode portions 14 disposed at intervals in a second direction intersecting the first direction and second wire portions 18 that build bridges and electrically connect the second island-shaped electrode portions adjacent to each other on the transparent base material 10.

The refractive indexes of the second island-shaped electrode portion 14 and the first wire portion 18 are preferably in a range of 1.75 to 2.1.

A material of the second island-shaped electrode portion 14 is not particularly limited, but needs to be a material capable of forming a transparent conductive film, and a well-known material can be used. Specific materials are the same as the material of the first island-shaped electrode portion 12.

As the second island-shaped electrode portion 14, it is possible to use, for example, a translucent metal oxide film such as an ITO film, an IZO film, or a $SiO_2$ film; a metal film of Al, Zn, Cu, Fe, Ni, Cr, Mo, Ag, Au, or the like; an alloy film of a plurality of metals such as a copper-nickel alloy; or the like.

The thickness of the second island-shaped electrode portion 14 can be set to 10 nm to 200 nm.

In addition, an amorphous ITO film may be transformed to a polycrystalline ITO film by firing. In the case of forming a conductive pattern using an ITO film or the like, it is possible to refer to the description of Paragraphs 0014 to 0016 of JP4506785B.

The shape of the second island-shaped electrode portion 14 is not particularly limited and may be any of a square shape, a rectangular shape, a rhombic shape, a trapezoidal shape, a pentagonal or higher polygonal shape, or the like, but a square shape, a rhombic shape, or a hexagonal shape is preferred since a fine packed structure is easily formed.

The second wire portion (bridge wire) 18 is not particularly limited as long as the second wire portion 18 is a member capable of electrically connecting the second island-shaped electrode portions 14 adjacent to each other. To the second wire portion 18, it is possible to apply the same material as the second island-shaped electrode portions 14, and the thickness is also the same. In addition, an amorphous ITO film may be transformed to a polycrystalline ITO film by firing.

Particularly, the second wire portion (bridge wire) 18 is preferably a transparent electrode. In a case where the second wire portion is disposed as a transparent electrode, the visibility of the bridge wire is more significantly decreased in a produced touch sensor, and an appearance-improving effect is strong.

The refractive indexes of the first electrode pattern 34 and the second electrode pattern 36 in the touch sensor of the embodiment of the present disclosure are preferably in a range of 1.75 to 2.1.

The transparent base material 10 is preferably an electrically insulating substrate.

As the electrically insulating substrate, for example, a glass substrate, a polyethylene terephthalate (PET) film, a polycarbonate (PC) film, a cycloolefin polymer (COP) film, a polyvinyl chloride (PVC) film, and the like are exemplified.

A COP film is preferred since the COP film is excellent not only in optical isotropy but also in dimensional stability and, furthermore, processing accuracy. In a case where the transparent base material is a glass substrate, the thickness may be 0.3 mm to 3 mm. In addition, in a case where the transparent base material 10 is a resin film, the thickness may be 20 μm to 3 mm.

The covering layer 27 is configured in a multilayer structure of two or more layers including a third transparent layer 22 and a fourth transparent layer 24 and is capable of improving the visibility of the second wire portion (bridge wire) 18 by being provided on the second wire portion 18.

The covering layer 27 may be configured in a two-layer structure and is preferably configured in a multilayer structure of three or more layers from the viewpoint of enhancing the covering property for the second wire portion 18. For example, in the touch sensor shown in FIG. 3, the covering layer 27 is formed by superimposing three layers of the third transparent layer 22, the fourth transparent layer 24, and a sixth transparent layer 26.

The details of the third transparent layer 22, the fourth transparent layer 24, and the sixth transparent layer 26 forming the covering layer 27 will be described below.

On the first electrode pattern 34 and the second island-shaped electrode portions 14 of the second electrode pattern 36, as protective layers, a first transparent layer 28 having a thin thickness and a high refractive index and a second transparent layer 30 having a thicker thickness and a lower refractive index than the first transparent layer 28 are sequentially superimposed from the electrode pattern side.

The first transparent layer 28 is provided so as to cover the first electrode pattern 34 and the second electrode pattern 36, and the second transparent layer 30 is further provided on the first transparent layer 28.

In the protective layers provided by superimposing the first transparent layer 28 and the second transparent layer 30, as shown in FIG. 3, through-holes 20 are formed. The second wire portion (bridge wire) 18 is connected to the second island-shaped electrode portions 14 exposed in the through-holes 20, and the bridge wire 18 builds a bridge between the second island-shaped electrode portions adjacent to each other so as to extend across the first wire portion 16, whereby the second island-shaped electrode portions are in an electrically connected state.

The first wire portion 16 in the first electrode pattern and the bridge wire 18 in the second electrode pattern are separated from each other by the protective layers as shown in FIG. 3 at an intersection portion at which the first wire portion and the bridge wire intersect each other and form a structure in which the first wire portion and the bridge wire are not electrically connected to each other.

The through-holes can be formed by irradiating the first transparent layer and the second transparent layer with light via a mask for forming desired through-holes and forming a pattern.

The hole diameter of the through-hole is preferably smaller relative to the width and the length of the second wire portion.

First, the first transparent layer 28 will be described.

The first transparent layer in the present disclosure is a transparent layer having a refractive index of 1.6 or higher and a thickness of 200 nm or less. The refractive index of the first transparent layer is preferably 1.6 to 1.9 and more preferably 1.65 to 1.8.

The thickness of the first transparent layer is preferably 200 nm or less, more preferably 20 nm to 200 nm, still more preferably 40 nm to 200 nm, and particularly preferably 50 nm to 100 nm.

Particularly, the first transparent layer is preferably 1.6 to 1.9 in refractive index and 20 nm to 200 nm in thickness and more preferably 1.6 to 1.9 in refractive index and 40 nm to 200 nm in thickness.

The refractive index of the first transparent layer is higher than the refractive index of the second transparent layer described below by 0.01 or more.

In this case, the second transparent layer is superimposed on the first transparent layer in the structure, and the refractive indexes of the layers decrease from a side close to the electrode patterns toward a side far from the electrode patterns. Therefore, it becomes more difficult for the electrode patterns to be visible to the outside, and touch sensors having an excellent appearance can be obtained.

Particularly, for the same reason as described above, the refractive index of the first transparent layer is more preferably higher than the refractive index of the second transparent layer described below by 0.10 or more and still more preferably higher than the refractive index of the second transparent layer by 0.15 or more.

The thickness of the first transparent layer is an average thickness measured using a transmission electron microscope (TEM). Specifically, a segment of the touch panel is formed using an ultramicrotome, a 5 mm-long region in a cross section of the segment is scanned using TEM, and the thicknesses of the first transparent layer are measured. Next, the arithmetic average of the measurement values of the thicknesses at 20 places separated at equal intervals was obtained and regarded as the average thickness.

A material of the first transparent layer is not particularly limited as long as the first transparent layer is a transparent film having a refractive index of 1.6 or higher and a film thickness of 200 nm or less. For the first transparent layer, for example, a metal oxide layer formed by sputtering may be used or a cured layer obtained by a curing reaction of a curable component in a first transparent transfer layer described below may be used.

The first transparent layer may be, for example, a layer formed by transferring the first transparent transfer layer of a transfer material described below onto the first electrode pattern and the second electrode pattern and causing a curing reaction.

The detail of a component forming the first transparent layer will be clarified in the description of the first transparent transfer layer in the transfer material described below.

Next, the second transparent layer 30 will be described. The second transparent layer in the present disclosure is a transparent layer having a refractive index of less than 1.6 and a thickness of 0.5 µm or more. The refractive index of the second transparent layer is preferably 1.4 or higher and less than 1.6 and more preferably 1.45 to 1.55.

The thickness of the second transparent layer is more preferably 0.5 µm to 20 µm and still more preferably 1 µm to 10 µm.

Particularly, the second transparent layer preferably has a film thickness of 0.5 µm to 20 µm and a refractive index of 1.4 or higher and less than 1.6.

Furthermore, it is more preferable that the first transparent layer is 20 nm to 200 nm in thickness and 1.6 to 1.9 in refractive index and the second transparent layer is 0.5 µm to 20 µm in thickness and 1.4 or higher to less than 1.6 in refractive index.

The thickness of the second transparent layer is an average thickness obtained by measuring a cross section of a laminate using a transmission electron microscope (TEM) and can be measured in the same manner as in the case of the first transparent layer.

The second transparent layer in the touch sensor of the embodiment of the present disclosure is preferably a cured layer obtained by a curing reaction of a curable component in a second transparent transfer layer described below.

The second transparent layer may be, for example, a layer formed by transferring the second transparent transfer layer of the transfer material described below and causing a curing reaction.

The second transparent layer is preferably a cured substance of a composition including an alkali-soluble resin, a polymerizable monomer, and a photopolymerization initiator.

The weight-average molecular weight of the alkali-soluble resin is preferably 35,000 or less, more preferably 25,000 or less, and still more preferably 20,000 or less.

The detail of a component forming the second transparent layer will be clarified in the description of the second transparent transfer layer in the transfer material described below including the alkali-soluble resin, the polymerizable monomer, and the photopolymerization initiator.

The content of a component derived from the alkali-soluble resin in the second transparent layer is preferably 30% by mass or more of the solid content of the second transparent layer. The content of the component derived from the alkali-soluble resin is preferably 30% by mass or more from the viewpoint of forming the second transparent layer in a tapered shape. The content of the component derived from the alkali-soluble resin is more preferably 40% by mass to 70% by mass of the solid content of the second transparent layer.

Between the second transparent layer 30 and the second wire portions 18, an eighth transparent layer having a refractive index of 1.6 or higher and a thickness of 40 nm to 200 nm is preferably provided.

The refractive index of the eighth transparent layer is preferably 1.6 to 1.9 and more preferably 1.65 to 1.8.

The thickness of the eighth transparent layer is preferably 200 nm or less, more preferably 40 nm to 200 nm, and still more preferably 50 nm to 100 nm.

Particularly, the eighth transparent layer is preferably 40 nm to 200 nm in thickness and 1.6 to 1.9 in refractive index.

The thickness of the eighth transparent layer is an average thickness measured using a transmission electron microscope (TEM) and can be measured in the same manner as in the case of the first transparent layer.

The eighth transparent layer can be formed in the same manner as the first transparent layer and can be formed by, for example, transferring an eighth transparent resin layer of a transfer material having the eighth transparent resin layer on a temporary support.

The first transparent layer and the second transparent layer in the present disclosure are preferably provided as transfer layers that are transferred and formed using a transfer method in which transfer materials described below are used. In a case where the first transparent layer and the second transparent layer are transfer layers, the respective layers are likely to be formed in highly uniform thicknesses, and thus a stable refractive index can be obtained, and an electrode pattern-covering property using the interference of light is more favorable.

Next, the third transparent layer 22, the fourth transparent layer 24, and the sixth transparent layer 26 forming the covering layer 27 disposed on the second wire portion 18 will be described.

Here, as an embodiment of the present invention, as a structure of the covering layer improving the visibility of the second wire portion, an aspect in which the third transparent layer 22, the fourth transparent layer 24, and the sixth transparent layer 26 are disposed will be mainly described with reference to FIG. 3. However, the structure of the covering layer on the second wire portion may be a different aspect, and, as a different embodiment of the present invention, the structure may be an aspect in which two layers of the third transparent layer 22 and the fourth transparent layer 24 are disposed.

The third transparent layer 22 is, as shown in FIG. 1 to FIG. 3, selectively disposed in a region including the first wire portion and the second wire portion and develops a covering action for the second wire portion (bridge wire) using the interference action of light developed in association with the fourth transparent layer 24 having a lower refractive index than the third transparent layer. Therefore, it is possible to significantly improve the visibility of the second wire portion, which is an easily visible portion of the electrode patterns, to the outside.

The third transparent layer in the present disclosure is 1.5 or higher in refractive index p and 300 nm or less in thickness.

The third transparent layer in the present disclosure has a preferred refractive index depending on the layer structure on the second wire portion, and the refractive index is preferably controlled to be in the following range.

That is, in the touch sensor shown in FIG. 3, which is an embodiment of the present invention, the covering layer made up of three layers of the sixth transparent layer 26, the third transparent layer 22, and the fourth transparent layer 24 is provided on the second wire portion (bridge wire) 18. An aspect in which the covering layer is configured in a multilayer structure of three or more layers, the covering property for the second wire portion 18 is favorable, and it is possible to effectively improve the visibility, which is preferable.

In the aspect in which the covering layer is configured in a multilayer structure (three-layer structure) of three or more layers, the refractive index p of the third transparent layer is preferably 1.5 to 2.4 and more preferably 1.7 to 2.35.

In addition, the covering layer provided on the bridge wire may have a two-layer structure.

For example, in an aspect in which, in FIG. 3, the sixth transparent layer is not provided and the covering layer is configured in a two-layer structure made up of the third transparent layer 22 and the fourth transparent layer 24, the refractive index p of the third transparent layer is preferably 1.5 to 1.75 and more preferably 1.65 to 1.7.

In addition, the third transparent layer in the present disclosure has a preferred thickness depending on the layer structure on the second wire portion, and the thickness is preferably controlled to be in the following range.

That is, in an aspect in which, as described above, the covering layer having a three-layer structure of the sixth transparent layer 26, the third transparent layer 22, and the fourth transparent layer 24 is provided on the second wire portion (bridge wire) 18, the thickness of the third transparent layer is preferably 10 nm to 100 nm and more preferably 10 nm to 50 nm.

In addition, in an aspect in which, as described above, for example, in FIG. 3, the sixth transparent layer is not provided and the covering layer is configured in a two-layer structure made up of the third transparent layer 22 and the fourth transparent layer 24, the thickness of the third transparent layer is preferably 300 nm or less, more preferably 20 nm to 300 nm, and still more preferably 50 nm to 80 nm.

Furthermore, in an aspect of having the covering layer in a three-layer structure on the second wire portion (bridge wire) 18 as in FIG. 3, the third transparent layer is preferably 1.5 to 2.4 in refractive index p and 10 nm to 100 nm in thickness and more preferably 1.7 to 2.35 in refractive index p and 10 nm to 50 nm in thickness.

In addition, in an aspect having covering layer in a two-layer structure on the bridge wire 18, the third transparent layer is preferably 1.5 to 1.75 in refractive index p and 20 nm to 300 nm in thickness and more preferably 1.65 to 1.7 in refractive index p and 50 nm to 80 nm in thickness.

The thickness of the third transparent layer is an average thickness measured using a transmission electron microscope (TEM) and can be measured in the same manner as in the case of the first transparent layer.

A material of the third transparent layer is not particularly limited as long as the third transparent layer is a transparent film having a refractive index p of 1.5 or higher and a thickness of 300 nm or less. For the third transparent layer, for example, a metal oxide layer formed by a vacuum deposition method or a sputtering method may be used or a cured layer formed by a curing reaction of a curable component in a third transparent transfer layer may be used.

The third transparent layer may also be, for example, a layer formed by transferring the third transparent transfer layer of a transfer material described below onto at least the second wire portion 18 in the second electrode pattern and formed by a curing reaction.

The details of components used to form the third transparent layer will be clarified by the description of the first transparent transfer layer in the transfer material described below.

The refractive index of the third transparent layer is preferably higher than the refractive index of the fourth transparent layer described below by 0.01 or more.

In this case, the fourth transparent layer is superimposed on the third transparent layer in the structure, and the refractive indexes of the layers decrease from a side close to the electrode patterns toward a side far from the electrode patterns. Therefore, it becomes more difficult for the electrode patterns to be visible to the outside, and touch sensors having a favorable appearance can be obtained.

Particularly, for the same reason as described above, the refractive index of the third transparent layer is more preferably higher than the refractive index of the fourth transparent layer described below by 0.07 or more and still more preferably higher than the refractive index of the fourth transparent layer by 0.15 or more.

The fourth transparent layer 24 is, as shown in FIG. 1 to FIG. 3, selectively disposed in a desired region including the first wire portion and the second wire portion, causes an interference action of light in association with the third transparent layer 22 having a higher refractive index than the fourth transparent layer 24 to cover the second wire portion, and significantly improves the visibility of the second wire portion. Therefore, it is possible to significantly improve the visibility of the second wire portion, which is an easily visible portion of the electrode patterns, to the outside.

The fourth transparent layer in the present disclosure is a transparent layer having a refractive index lower than the refractive index p of the third transparent layer and a thickness of 0.5 µm or more. The refractive index of the fourth transparent layer is preferably 1.4 to 1.6 and more preferably 1.45 to 1.55.

The thickness of the fourth transparent layer is preferably 0.5 µm or more, more preferably 0.5 µm to 20 µm, and still more preferably 1 µm to 10 µm.

Particularly, the fourth transparent layer is preferably 1.4 to 1.6 in refractive index and 0.5 µm to 20 µm in thickness.

Particularly, an aspect in which, as shown in FIG. 3, three layers of the sixth transparent layer 26, the third transparent layer 22, and the fourth transparent layer 24 are provided on the bridge wire 18, the third transparent layer is 1.5 to 2.4 in refractive index p and 10 nm to 100 nm in thickness, and the fourth transparent layer is 1.4 to 1.6 in refractive index and 0.5 µm to 20 µm in thickness is more preferred, and, furthermore, an aspect in which three layers of the sixth transparent layer 26, the third transparent layer 22, and the fourth transparent layer 24 are provided on the bridge wire 18, the third transparent layer is 1.7 to 2.35 in refractive index p and 10 nm to 50 nm in thickness, and the fourth transparent layer is 1.45 to 1.55 in refractive index and 1 µm to 10 µm in thickness is preferred.

The thickness of the fourth transparent layer is an average thickness measured using a transmission electron microscope (TEM) and can be measured in the same manner as in the case of the first transparent layer.

The fourth transparent layer in the touch sensor of the embodiment of the present disclosure is preferably a cured layer obtained by a curing reaction of a curable component in a fourth transparent transfer layer described below.

The fourth transparent layer may be, for example, a layer formed by transferring the second transparent transfer layer of the transfer material described below and causing a curing reaction. The detail of a component forming the fourth transparent layer will be clarified in the description of the fourth transparent transfer layer in the transfer material described below including the alkali-soluble resin, the polymerizable monomer, and the photopolymerization initiator.

The fourth transparent layer is preferably a cured substance of a composition including an alkali-soluble resin, a polymerizable monomer, and a photopolymerization initiator.

The weight-average molecular weight of the alkali-soluble resin is preferably 35,000 or less, more preferably 25,000 or less, and still more preferably 20,000 or less.

The content of a component derived from the alkali-soluble resin in the fourth transparent layer is preferably 30% by mass or more of the solid content of the fourth transparent layer. The content of the component derived from the alkali-soluble resin is preferably 30% by mass or more from the viewpoint of forming the fourth transparent layer in a tapered shape. The content of the component derived from the alkali-soluble resin is more preferably 40% by mass to 70% by mass of the solid content of the fourth transparent layer.

The third transparent layer and the fourth transparent layer in the present disclosure are preferably provided as transfer layers that are transferred and formed using a transfer method in which transfer materials described below are used. In a case where the third transparent layer and the fourth transparent layer are transfer layers, the respective layers are likely to be formed in highly uniform thicknesses, and thus a stable refractive index can be obtained, and an electrode pattern-covering property using the interference of light is more favorable.

Next, the sixth transparent layer 26 will be described.

The sixth transparent layer 26 is disposed as a low-refractive index layer having a refractive index lower than that of the third transparent layer between the second wire portion 18 and the third transparent layer having a higher refractive index than the fourth transparent layer. Therefore, on the second wire portion, a laminate structure of a low-refractive index layer/a high-refractive index layer/a low-refractive index layer from an observation surface side far from the second wire portion is formed, and an effect for improving the visibility of the second wire portion is strong.

The thickness of the sixth transparent layer is 200 nm or less.

The thickness of the sixth transparent layer is preferably 10 nm to 100 nm, more preferably 10 nm to 50 nm, and still more preferably 10 nm to 30 nm.

The refractive index of the sixth transparent layer is preferably lower than the refractive index of the third transparent layer, and the refractive index is preferably 1.6 or less. In a case where the sixth transparent layer has a lower refractive index than the third transparent layer, the bridge wire-covering property improves, and it is possible to further improve the visibility of the electrode patterns including the bridge wire.

The refractive index of the sixth transparent layer is preferably 1.2 to 1.6, more preferably 1.3 to 1.5, and still more preferably 1.4 to 1.5.

Particularly, the sixth transparent layer is preferably 1.3 to 1.5 in refractive index and 10 nm to 50 nm in thickness.

The thickness of the sixth transparent layer is an average thickness measured using a transmission electron microscope (TEM) and can be measured in the same manner as in the case of the first transparent layer.

A material used to form the sixth transparent layer is not particularly limited as long as the sixth transparent layer is a low-refractive index layer having a refractive index lower than that of the third transparent layer (preferably a low-refractive index layer having a refractive index of 1.6 or less and a thickness of 200 nm or less), and it is possible to use the same material as the materials used for the first transparent layer and the third transparent layer except for a component such as particles having an influence on the refractive index.

For the sixth transparent layer, for example, a metal oxide layer formed by a vacuum deposition method or a sputtering method can be used or a cured layer formed by a curing reaction of a curable component in a sixth transparent transfer layer may be used.

The sixth transparent layer is preferably, for example, a transfer layer disposed between the second wire portion 18 and the third transparent layer 22 by transferring the sixth transparent transfer layer of a transfer material described below onto at least the second wire portion 18 in the second electrode pattern and may be a layer formed by a curing reaction.

The details of components used to form the sixth transparent layer will be clarified by the description of the sixth transparent transfer layer (except for the particles) in the transfer material described below. The particles included in the sixth transparent layer are preferably particles imparting a low refractive index, preferably inorganic oxide particles having a refractive index of 1.6 or less (preferably 1.5 or less), and preferably $SiO_2$ or the like.

Based on the above description, the third transparent layer, the fourth transparent layer, and the sixth transparent layer more preferably have the following relationship.

That is, the third transparent layer is 1.5 to 2.4 in refractive index and 10 nm to 100 nm in thickness, the fourth transparent layer is 1.4 to 1.6 in refractive index and 0.5 μm to 20 μm in thickness, and the sixth transparent layer is 1.2 to 1.6 in refractive index and 10 nm to 100 nm in thickness.

In such a case, the reflectivity of the bridge wire is effectively suppressed, and it is possible to further enhance the covering property for wiring patterns including the bridge wire.

In addition to what has been described above, in the touch sensor shown in FIG. 3, an overcoat layer 40 is disposed on a side of the fourth transparent layer 24 opposite to a side on which the fourth transparent layer is in contact with the third transparent layer 22 as a transparent layer for flattening an upper surface of the electrode pattern-attached base material.

The overcoat layer 40 is, similar to the fourth transparent layer 24, preferably a layer having a refractive index of 1.4 to 1.6 and more preferably a layer having a refractive index of 1.45 to 1.55.

The thickness of the overcoat layer 40 is not particularly limited, but the thickness on the fourth transparent layer is preferably set to 0.5 μm or more and more preferably set to 0.5 μm to 20 μm.

The details of components used to form the overcoat layer 40 are the same as those for the fourth transparent layer and will be clarified by the description of the fourth transparent transfer layer in the transfer material described below.

The overcoat layer 40 may also be provided as a single fourth transparent layer including the fourth transparent layer 24.

This will be described in a modification example described below.

Next, the fifth transparent layer will be described.

As shown in FIG. 3, a fifth transparent layer 32 is disposed between the transparent base material 10 and the first electrode pattern 34 and the second electrode pattern 36. In the case of disposing the fifth transparent layer 32, the electrode patterns are sandwiched between the fifth transparent layer 32 and the first transparent layer to the fourth transparent layer and the sixth transparent layer in the structure, and, thus, in a case where, for example, a film having a relatively high refractive index such as an ITO film is used as the electrode patterns, there is an effect for decreasing the light reflectivity of the electrode patterns. Therefore, the visibility of the bridge wire (second wire portion) 18 in the touch sensor is effectively improved, the bridge wire is covered, and the appearance is excellent.

For the above-described reason, the fifth transparent layer is preferably a high-refractive index layer having a refractive index of 1.6 or higher.

The refractive index of the fifth transparent layer is preferably 1.6 to 1.9, more preferably 1.6 to 1.7, and still more preferably 1.6 to 1.65.

The thickness of the fifth transparent layer is preferably 200 nm or less, more preferably 40 nm to 200 nm, and still more preferably 50 nm to 100 nm.

Particularly, the fifth transparent layer is preferably 1.6 or higher in refractive index and 200 nm or more in thickness and more preferably 1.6 to 1.7 in refractive index and 50 nm to 100 nm in thickness.

The fifth transparent layer 32 is, as shown in FIG. 3, a layer disposed on the transparent base material 10, and thus a transparent base material on which the fifth transparent layer is formed may be used as the transparent base material.

The thickness of the fifth transparent layer is an average thickness measured using a transmission electron microscope (TEM) and can be measured in the same manner as in the case of the first transparent layer.

A material used to form the fifth transparent layer is not particularly limited as long as the fifth transparent layer is a high-refractive index layer (preferably a high-refractive index layer having a refractive index of 1.6 or higher and a thickness of 200 nm or less), and it is possible to use the same material as the materials used for the first transparent layer and the third transparent layer.

For the fifth transparent layer, a cured layer formed by a curing reaction of a curable component in a fifth transparent transfer layer may be used.

The fifth transparent layer is preferably, for example, a transfer layer disposed by transferring the fifth transparent transfer layer of a transfer material described below onto the transparent base material 10 and may be a layer formed by a curing reaction.

The details of components used to form the fifth transparent layer will be clarified by the description of the fifth transparent transfer layer in the transfer material described below.

Modification examples of the touch sensor of the embodiment of the present disclosure will be described.

The same configuration as in the embodiment of the touch sensor shown in FIG. 1 to FIG. 3 will be given the same reference and will not be described again.

Modification Example 1

Modification Example 1 will be described with reference to FIG. 4.

Figure 4:
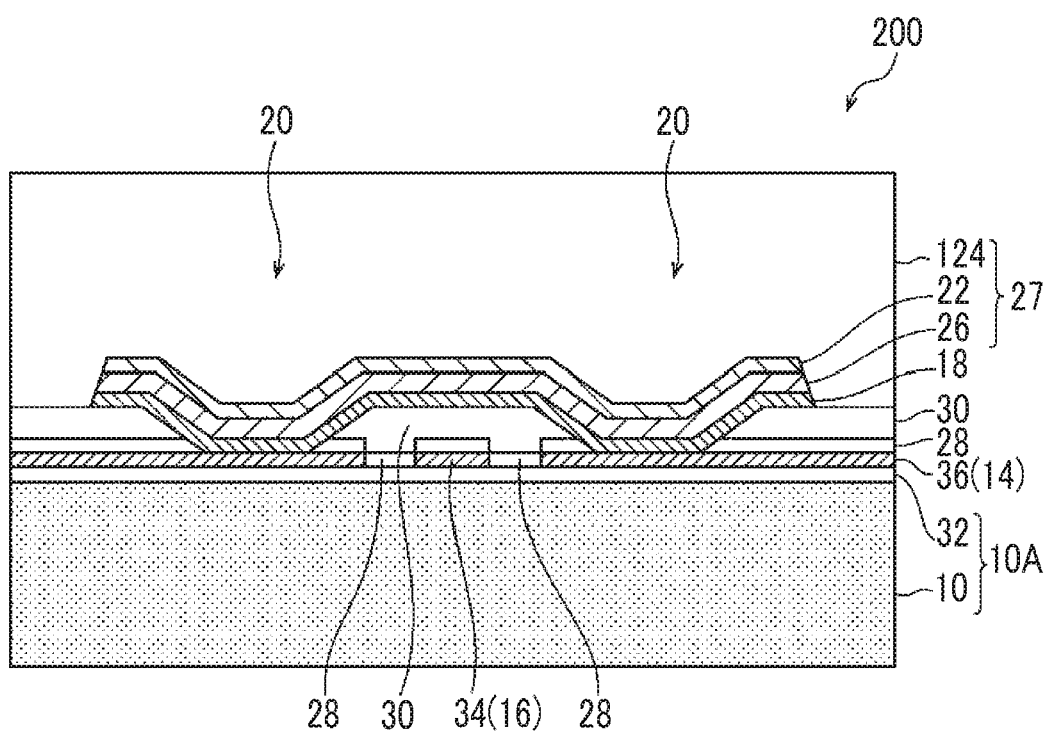
FIG. 4 is a plan view showing a modification example of the touch sensor in a state in which the covering layer is provided on the bridge wire and the electrode pattern is not easily visible.

A touch sensor 200 is an aspect in which, as shown in FIG. 4, instead of the fourth transparent layer 24 in FIG. 3, a fourth transparent layer 124 covering the entire surface of the electrode pattern-attached base material on which the first electrode pattern and the second electrode pattern are provided is disposed on the electrode pattern-attached base material.

In the touch sensor of the embodiment of the present disclosure, the fourth transparent layer disposed on the third transparent layer is provided to improve the visibility of the bridge wire 18, and thus, in consideration of conditions such as the shape of a product and manufacturing steps, the fourth transparent layer may be disposed to cover at least the bridge wire 18 without providing the overcoat layer 40 in FIG. 3. However, depending on cases, as shown in FIG. 3, the overcoat layer 40 is disposed as a flattening layer in order to flatten the surface of the electrode pattern-attached base material.

In this case, the overcoat layer 40 in FIG. 3 is similar to the fourth transparent layer 24 in refractive index, and thus there is no need for providing both layers as separate layers, and, as shown in FIG. 4, the fourth transparent layer may be formed as a single layer also functioning as the overcoat layer in FIG. 3. In such a case, it is possible to improve manufacturing suitability.

Modification Example 2

As another modification example of the touch sensor of the embodiment of the present disclosure, Modification Example 2 will be described with reference to FIG. 5.

Figure 5:
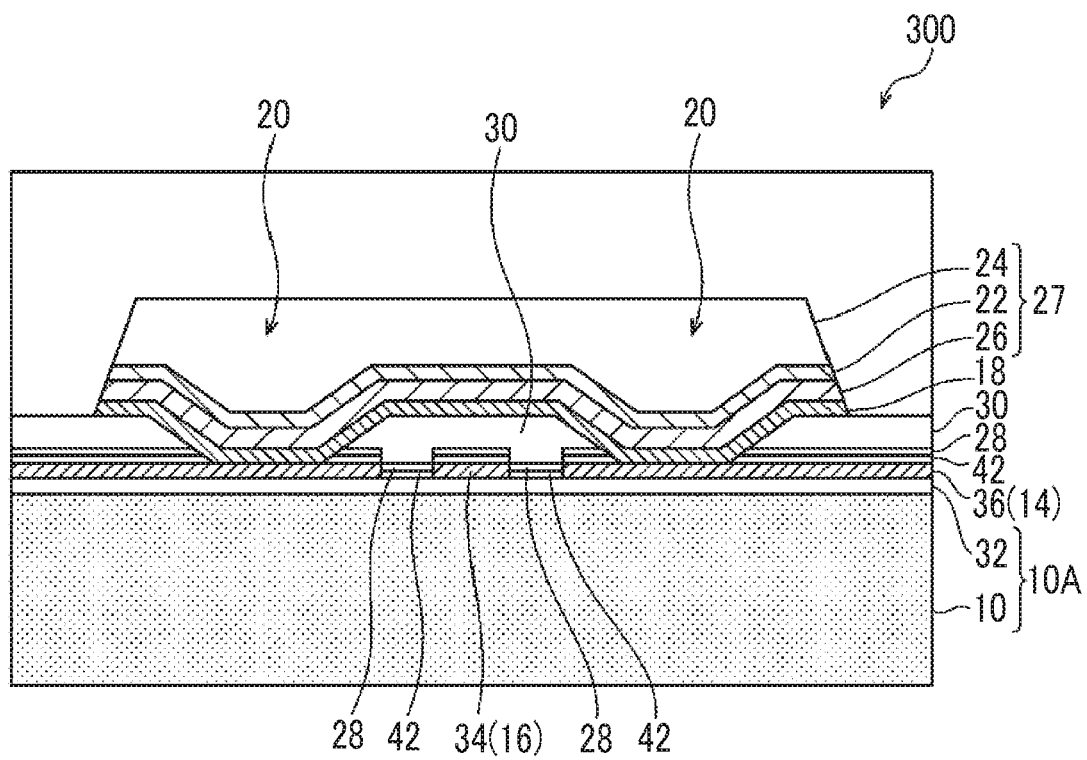
FIG. 5 is a plan view showing another modification example of the touch sensor in a state in which the covering layer is provided on the bridge wire and the electrode pattern is not easily visible.

A touch sensor 300 is an aspect in which, as shown in FIG. 5, a seventh transparent layer 42 having a refractive index of 1.5 or less and a thickness of 200 nm or less is further disposed between the first transparent layer 28 and the first electrode pattern 34 and the second electrode pattern 36.

The seventh transparent layer is preferably a low-refractive index layer having a refractive index of 1.5 or higher, and, for example, in the case of using a film having a relatively high refractive index such as an ITO film, a low-refractive index layer having a refractive index lower than that of the first transparent layer is disposed between the first transparent layer having a refractive index of 1.6 or higher and the first electrode pattern 34 and the second electrode pattern 36 in the structure. Therefore, on the first electrode pattern 34 and the second electrode pattern 36, a laminate structure of a low-refractive index layer/a high-refractive index layer/a low-refractive index layer is disposed, and, consequently, it is possible to further decrease the reflectivity of the electrode patterns.

Modification Example 3

As still another modification example of the touch sensor of the embodiment of the present disclosure, Modification Example 3 will be described with reference to FIG. 6.

Figure 6:
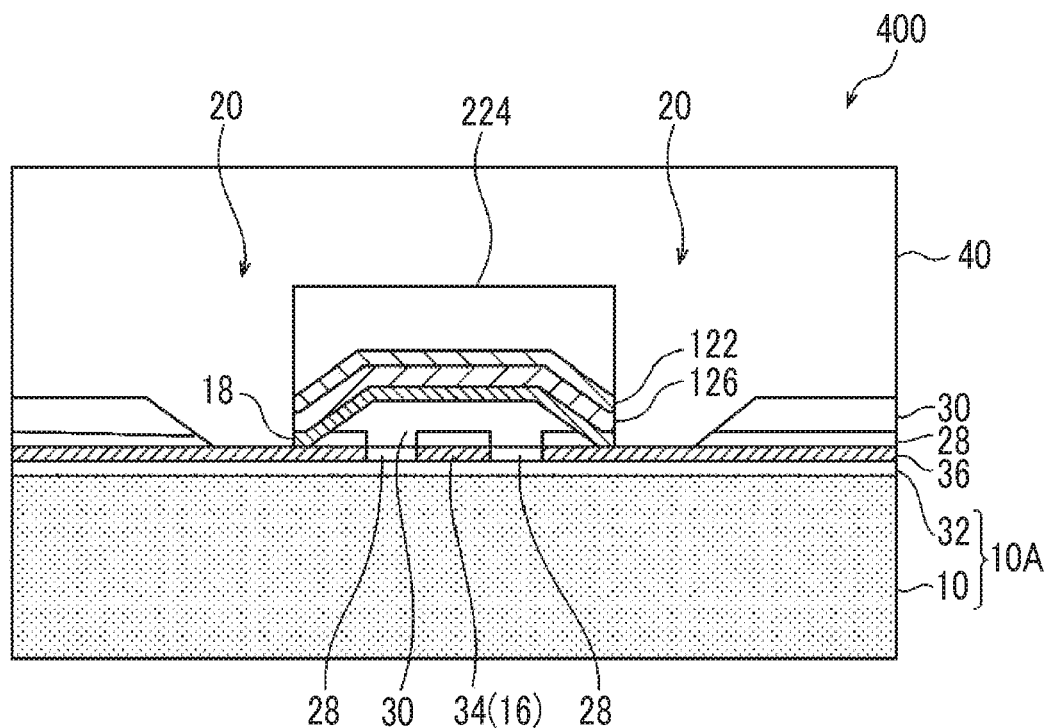
FIG. 6 is a plan view showing still another modification example of the touch sensor in a state in which the covering layer is provided on the bridge wire and the electrode pattern is not easily visible.

A touch sensor 400 is an aspect in which, as shown in FIG. 6, the second wire portion (bridge wire) 18 building a bridge between the plurality of second island-shaped electrode portions in the second electrode pattern is in the through-hole.

In the case of such a structure, the third transparent layer and the fourth transparent layer simply need to be disposed at a location for covering at least the bridge wire 18, and thus a sixth transparent layer 126, a third transparent layer 122, and a fourth transparent layer 224 need to be disposed in accordance with the bridge wire as shown in FIG. 6.

A detection method in the touch sensor of the embodiment of the present disclosure may be any of well-known methods such as a resistance film method, an electrostatic capacitance method, an ultrasonic method, an electromagnetic induction method, and an optical method. Among these, the electrostatic capacitance method is preferred.

As types of the touch sensor, a so-called in-cell type (for example, a touch sensor shown in FIG. 5, FIG. 6, FIG. 7, and FIG. 8 of JP2012-517051A), a so-called on-cell type (for example, a touch sensor shown in FIG. 19 of JP2013-168125A or a touch sensor shown in FIG. 1 or FIG. 5 of JP2012-089102A), a one glass solution (OGS) type, a touch-on-lens (TOL) type (for example, a touch sensor shown in FIG. 2 of JP2013-054727A), other configurations (for example, a touch sensor shown in FIG. 6 of JP2013-164871A), and a variety of out-cell types (so-called GG, G1·G2, GFF, GF2, GF1, G1F, and the like) can be exemplified.

To the touch sensor of the embodiment of the present disclosure and an image display device of the embodiment of the present disclosure including the touch sensor, it is possible to apply a configuration disclosed in, for example, "Advanced Touch Panel Technologies" (Jul. 6, 2009, published by Fujisan Magazine Service Co., Ltd.), "Technologies and Developments of Touchpanels" edited by Yuji Mitani, CMC Publishing Co., Ltd. (December 2004), FPD International 2009 Forum T-11 Lecture Textbook, Cypress Semiconductor Corporation application note AN2292, and the like.

<Method for Manufacturing Touch Sensor>

The touch sensor of the embodiment of the present disclosure can be manufactured by selecting a random method as long as the method is capable of producing the above-described structure, and the touch sensor is preferably manufactured using a method for manufacturing a touch sensor of the embodiment of the present disclosure described below.

That is, the touch sensor of the embodiment of the present disclosure is preferably manufactured using a method including the formation of the third transparent layer having a refractive index p of 1.50 or higher and a thickness of 200 nm or less by transferring a transfer layer of a transfer material on the second wire portions in the second electrode pattern of an electrode pattern-attached base material including the first electrode pattern and the second electrode pattern respectively extending in mutually intersecting directions on the same surface of the transparent base material (hereinafter, also referred to as the third transparent layer-forming step) and the formation of the fourth transparent layer having a refractive index lower than the refractive index p and a thickness of 0.5 µm or more on the third transparent layer by transferring a transfer layer of a transfer material (hereinafter, also referred to as the fourth transparent layer-forming step).

In the present disclosure, the high-refractive index layer (third transparent layer) having a refractive index p of 1.50 or higher and a thickness of 200 nm or less is disposed on the second wire portion (bridge wire) in the second electrode pattern, and, furthermore, the low-refractive index layer (fourth transparent layer) having a lower refractive index than the high-refractive index layer and a thickness of 0.5 µm or more is superimposed on the high-refractive index layer, whereby the covering property for the bridge wire, which is an easily visible portion of the electrode patterns, becomes excellent, and the visibility is more effectively improved.

In addition, the respective transparent layers are formed by a transfer method using the transfer materials, and thus uniform thicknesses are obtained, and the adhesiveness improves. Therefore, a laminate being excellent particularly in the bridge wire-covering property can be obtained.

The method for manufacturing a touch sensor of the embodiment of the present disclosure preferably further includes, before the formation of the third transparent layer, the formation of the first transparent layer having a refractive index of 1.6 or higher and a thickness of 200 nm or less on the electrode pattern-attached base material by transferring a transfer layer of a transfer material (hereinafter, also referred to as the first transparent layer-forming step) and the formation of the second transparent layer having a refractive index of less than 1.6 and a thickness of 0.5 µm or more on the electrode pattern-attached base material by transferring a transfer layer of a transfer material (hereinafter, also referred to as the second transparent layer-forming step).

Furthermore, the disposition of the specific first transparent layer and the specific second transparent layer provides a structure in which the thin high-refractive index layer and the low-refractive index layer having a thicker thickness and a lower refractive index than the high-refractive index layer are laminated on the first electrode pattern having the plurality of first island-shaped electrode portions and the second electrode pattern having the plurality of second island-shaped electrode portions, and thus the electrode pattern-covering property further improves. Therefore, the visibility of the electrode patterns is significantly improved throughout the entire touch sensor.

In addition, the respective transparent layers are formed by a transfer method using the transfer materials, and thus uniform thicknesses are obtained, and the adhesiveness improves. Therefore, a laminate being excellent in the covering property for the first electrode pattern and the second electrode pattern can be obtained.

The method for manufacturing the touch panel of the embodiment of the present disclosure preferably further includes, after the first transparent layer-forming step and the second transparent layer-forming step and before the third transparent layer-forming step, the formation of the sixth transparent layer having a refractive index of 1.6 or less (more preferably 1.55 or less) and a thickness of 200 nm or less on the second wire portion by transferring a transfer layer of a transfer material (hereinafter, also referred to as the sixth transparent layer-forming step).

The refractive index of the sixth transparent layer is preferably lower than the refractive index of the third transparent layer. In a case where the sixth transparent layer has a lower refractive index than the third transparent layer, the bridge wire-covering property improves, and it is possible to further improve the visibility of the electrode patterns including the bridge wire.

On the second wire portion, a laminate structure of a low-refractive index layer/a high-refractive index layer/a low-refractive index layer from the observation surface of the touch sensor is formed, and thus an effect for improving the visibility of the second wire portion is strong. In addition, the sixth transparent layer is formed by a transfer method using the transfer material, and thus a uniform thickness is obtained, and the adhesiveness also improves. Therefore, a laminate being excellent in the bridge wire-covering property can be obtained.

(Transfer Materials)

Next, transfer materials preferable for the production of the touch panel of the embodiment of the present disclosure will be described.

The method for manufacturing the touch sensor of the embodiment of the present disclosure may be an aspect in which, in the case of transferring and forming the third transparent layer and the fourth transparent layer, the third transparent layer and the fourth transparent layer are sequentially transferred and formed using a transfer material having a third transparent transfer layer and a transfer material having a fourth transparent transfer layer. In addition, the method may be an aspect in which the third transparent layer and the fourth transparent layer are collectively transferred and formed using transfer materials having a third transparent transfer layer and a fourth transparent transfer layer.

In the manufacturing method of the embodiment of the present disclosure, between both aspects, the aspect in which the third transparent layer and the fourth transparent layer are collectively transferred using transfer materials having a third transparent transfer layer and a fourth transparent transfer layer is preferred from the viewpoint of the manufacturing efficiency.

Based on the above description, the manufacturing method of the embodiment of the present disclosure is preferably a method in which (i) a transfer material having a temporary support, from the temporary support side, the fourth transparent transfer layer having a refractive index lower than the refractive index p of the third transparent transfer layer and a thickness of 0.5 μm or more, the third transparent transfer layer having a refractive index p of 1.50 or higher and a thickness of 200 nm or less, and, as necessary, a sixth transparent transfer layer having a refractive index lower than the refractive index of the third transparent transfer layer (preferably a refractive index of 1.6 or less) and a thickness of 200 nm or less in this order and (ii) a transfer material having a temporary support, from the temporary support side, the second transparent transfer layer having a refractive index of less than 1.6 and a thickness of 0.5 μm or more, the first transparent transfer layer having a refractive index of 1.6 or higher and a thickness of 200 nm or less, and, as necessary, a seventh transparent transfer layer having a refractive index of 1.5 or less and a thickness of 200 nm or less in this order are used.

Here, the fourth transparent transfer layer is a layer to become the fourth transparent layer of the touch sensor, and the third transparent transfer layer is a layer to become the third transparent layer of the touch sensor. In addition, the first transparent transfer layer is a layer to become the first transparent layer of the touch sensor, and the second transparent transfer layer is a layer to become the second transparent layer of the touch sensor.

Hereinafter, materials used in the transfer material will be described.

(Temporary Support)

A material of the temporary support is not particularly limited as long as the material has a strength and flexibility necessary for the formation of a film. A resin film is preferred from the viewpoint of formability and costs.

A film that is used as the temporary support is preferably a flexible film that does not significantly deform, shrink, or stretch under pressurization or under pressurization and heating.

More specifically, as the temporary support, a polyethylene terephthalate (PET) film, a triacetyl cellulose (TAC) film, a polystyrene (PS) film, a polycarbonate (PC) film, and the like are exemplified, and a biaxially stretched polyethylene terephthalate film is preferred.

The appearance of the temporary support is also not particularly limited, and the temporary support may be a transparent film or a colored film. As the colored film, resin films containing a silicon dye, an alumina sol, a chromium salt, a zirconium salt, or the like are exemplified.

To the temporary support, it is possible to impart a conductive property using a method described in JP2005-221726A or the like.

Hereinafter, regarding the layers on the temporary support, the second transparent transfer layer, the first transparent transfer layer, and the seventh transparent transfer layer, the fourth transparent transfer layer, the third transparent transfer layer, and the sixth transparent transfer layer will be described.

In the case of forming the touch panel of the embodiment of the present disclosure by a transfer method using the transfer material, a layer formed by the curing reaction of the second transparent transfer layer is the second transparent layer, a layer formed by the curing reaction of the first transparent transfer layer is the first transparent layer, a layer formed by the curing reaction of the fourth transparent transfer layer is the fourth transparent layer, and a layer formed by the curing reaction of the third transparent transfer layer is the third transparent layer. In addition, a layer formed by the curing reaction of the sixth transparent transfer layer is the sixth transparent layer, and a layer formed by the curing reaction of the seventh transparent transfer layer is the seventh transparent layer.

(Second Transparent Transfer Layer)

The second transparent transfer layer is a layer that is to be the second transparent layer after being transferred.

The second transparent transfer layer may be, for example, a layer including at least a polymerizable monomer and a resin or may be a layer that is cured by imparting energy. The second transparent transfer layer may further include a polymerization initiator and a compound capable of reacting with an acid by heating.

The second transparent transfer layer may be light-curable, heat-curable, or heat-curable and light-curable. Particularly, the second transparent transfer layer is preferably a heat-curable and light-curable composition since it is possible to further improve the reliability of the film.

That is, the second transparent layer may be formed as described below.

The second transparent transfer layer is transferred to a transfer target by a transfer method using the transfer material having the second transparent transfer layer on the temporary support. The transferred second transparent transfer layer is patterned by being irradiated with light. A treatment such as developing or the like is carried out on the patterned second transparent transfer layer.

It is preferable that the second transparent transfer layer in the present disclosure is an alkali-soluble resin layer and can be developed by a weak alkali aqueous solution.

The thickness of the second transparent transfer layer is not particularly limited and can be appropriately selected depending on the purpose. For example, in a case where the touch sensor of the embodiment of the present disclosure is an electrostatic capacitance-type input device, the thickness of the second transparent transfer layer is preferably 1 μm to 20 μm, more preferably 2 μm to 15 μm, and still more preferably 2 μm to 10 μm from the viewpoint of transparency.

The second transparent transfer layer may be formed of a negative-type material including a polymerizable monomer. In this case, the second transparent transfer layer becomes excellent in terms of strength and reliability.

—Resin—

The second transparent transfer layer is capable of containing at least one kind of resin. The resin is capable of functioning as a binder. The resin included in the second transparent transfer layer is preferably an alkali-soluble resin.

The alkali-soluble resin is preferably, for example, a resin having an acid value of 60 mgKOH/g or more from the viewpoint of developability. In addition, a resin having a carboxyl group is preferred since the resin reacts with a crosslinking component to thermally cross-link and is likely to form a strong film.

The alkali-soluble resin is preferably an acrylic resin from the viewpoint of developability and transparency. The acrylic resin refers to a resin having a configurational unit derived from at least one kind of (meth)acrylic acid or (meth)acrylic acid ester.

The acid value of the alkali-soluble resin is not particularly limited, but a carboxyl group-containing acrylic resin having an acid value of 60 mgKOH/g or more is preferred.

The carboxyl group-containing acrylic resin having an acid value of 60 mgKOH/g or more is not particularly limited as long as the condition of the acid value is satisfied, and a resin appropriately selected from well-known resins can be used. For example, among the polymers described in Paragraph 0025 of JP2011-095716A, the carboxyl group-containing acrylic resin having an acid value of 60 mgKOH/g or more, among the polymers described in Paragraphs 0033 to 0052 of JP2010-237589A, the carboxyl group-containing acrylic resin having an acid value of 60 mgKOH/g or more, and the like are exemplified.

A preferred range of the copolymerization ratio of a monomer having a carboxyl group in the alkali-soluble resin is 5% by mass to 50% by mass, more preferably 5% by mass to 40% by mass, and still more preferably in a range of 20% by mass to 30% by mass with respect to 100% by mass of the alkali-soluble resin.

As the alkali-soluble resin, polymers shown below are preferred. The content ratio of each structural unit shown below can be appropriately changed depending on the purpose.

Compound A

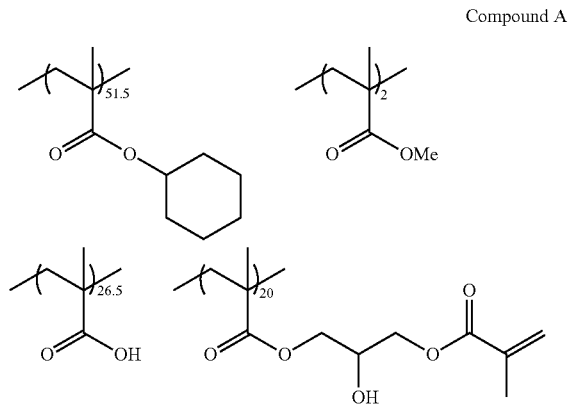

Specifically, the acid value of the alkali-soluble resin is preferably 60 mgKOH/g to 200 mgKOH/g, more preferably 60 mgKOH/g to 150 mgKOH/g, and still more preferably 60 mgKOH/g to 110 mgKOH/g.

In the present specification, the acid value of the resin is a value measured using a titration method regulated in JIS K0070 (1992).

In a case where both the second transparent transfer layer and the first transparent transfer layer described below contain the acrylic resin, it is possible to enhance the interlayer adhesiveness between the second transparent transfer layer and the first transparent transfer layer.

The weight-average molecular weight of the alkali-soluble resin is preferably 5,000 or more and more preferably 10,000 or more. The upper limit value of the weight-average molecular weight of the alkali-soluble resin is not particularly limited and may be set to 100,000.

From the viewpoint of the handleability of the second transparent transfer layer to be cured and the hardness of the cured film, the content of the resin is preferably in a range of 10% by mass to 80% by mass and more preferably in a range of 40% by mass to 60% by mass of the total solid content amount of the second transparent transfer layer. In a case where the content of the resin is 80% by mass or less, the amount of the monomer does not become too small, the crosslink density of a cured film is favorably maintained, and the second transparent transfer layer becomes excellent in terms of hardness. In addition, in a case where the content of the resin is 10% by mass or more, the film to be cured does not become too soft, and there is an advantage in handleability in the film.

—Polymerizable Monomer—

The second transparent transfer layer in the present disclosure may contain a polymerizable monomer.

As the polymerizable monomer, the second transparent transfer layer preferably includes a polymerizable monomer having an ethylenic unsaturated group and more preferably includes a photopolymerizable compound having an ethylenic unsaturated group. The polymerizable monomer preferably has at least one ethylenic unsaturated group as a photopolymerizable group and may have a cationic polymerizable group such as an epoxy group in addition to the ethylenic unsaturated group. The polymerizable monomer included in the second transparent transfer layer is preferably a compound having a (meth)acryloyl group.

The second transparent transfer layer preferably includes, as the polymerizable monomer, a compound having two ethylenic unsaturated groups and a compound having at least three ethylenic unsaturated groups and more preferably includes a compound having two (meth)acryloyl groups and a compound having at least three (meth)acryloyl groups.

In addition, at least one kind of the polymerizable monomer preferably contains a carboxyl group since a carboxyl group in the resin and the carboxyl group in the polymerizable monomer form a carboxyl acid anhydride, thereby enhancing moisture-heat resistance.

The polymerizable monomer containing a carboxyl group is not particularly limited, and commercially available compounds can be used. As commercially available products, for example, ARONIX TO-2349 (manufactured by Toagosei Co., Ltd.), ARONIX M-520 (manufactured by Toagosei Co., Ltd.), ARONIX M-510 (manufactured by Toagosei Co., Ltd.), and the like are preferably exemplified. In a case where the second transparent transfer layer includes the polymerizable monomer containing a carboxyl group, the content of the polymerizable monomer containing a carboxyl group used is preferably in a range of 1% by mass to 50% by mass, more preferably in a range of 1% by mass to 30% by mass, and still more preferably in a range of 5% by mass to 15% by mass of all of the polymerizable monomers included in the second transparent transfer layer.

The polymerizable monomer preferably includes a urethane (meth)acrylate compound.

In a case where the second transparent transfer layer includes the urethane (meth)acrylate compound, the content thereof is preferably 10% by mass or more and more preferably 20% by mass or more of all of the polymerizable monomers included in the second transparent transfer layer. The number of functional groups of the photopolymerizable group in the urethane (meth)acrylate compound, that is, the number of (meth)acryloyl groups is preferably three or more and more preferably four or more.

The polymerizable monomer having a bifunctional ethylenic unsaturated group is not particularly limited as long as the polymerizable monomer is a compound having two ethylenic unsaturated groups in the molecule, and it is possible to use commercially available (meth)acrylate compounds. As commercially available products, for example, tricyclodecane dimethanol diacrylate (A-DCP, manufactured by Shin-Nakamura Chemical Co., Ltd.), tricyclodecane dimethanol dimethacrylate (DCP, manufactured by Shin-Nakamura Chemical Co., Ltd.), 1,9-nonanediol diacrylate (A-NOD-N, manufactured by Shin-Nakamura Chemical Co., Ltd.), 1,6-hexanediol diacrylate (A-HD-N, manufactured by Shin-Nakamura Chemical Co., Ltd.), and the like are preferably exemplified.

A polymerizable monomer having a tri- or higher-functional ethylenic unsaturated group is not particularly limited as long as the polymerizable monomer is a compound having three or more ethylenic unsaturated groups in a molecule, and it is possible to use, for example, (meth)acrylate compounds having a skeleton such as dipentaerythritol (tri/tetra/penta/hexa)acrylate, pentaerythritol (tri/tetra)acrylate, trimethylolpropane triacrylate, ditrimethylolpropane tetraacrylate, isocyanurate acrylate, and glycerine triacrylate.

The molecular weight of the polymerizable monomer is preferably 200 to 3,000, more preferably 250 to 2,600, and particularly preferably 280 to 2,200.

Only one kind of the polymerizable monomer may be used, or two or more kinds of the polymerizable monomers may be used. Two or more kinds of the polymerizable monomers are preferably used since it is possible to control the film properties of the second transparent transfer layer.

Particularly, as the polymerizable monomer contained in the second transparent transfer layer, a combination of a tri- or higher-functional polymerizable monomer and a bifunctional polymerizable monomer is preferably used from the viewpoint of improving the film properties of the transferred second transparent transfer layer after being exposed.

In the case of using a bifunctional polymerizable monomer, the amount of the bifunctional polymerizable monomer used is preferably in a range of 10% by mass to 90% by mass, more preferably in a range of 20% by mass to 85% by mass, and still more preferably in a range of 30% by mass to 80% by mass of all of the polymerizable monomers included in the second transparent transfer layer.

In the case of using a tri- or higher-functional polymerizable monomer, the amount of the tri- or higher-functional polymerizable monomer used is preferably in a range of 10% by mass to 90% by mass, more preferably in a range of 15% by mass to 80% by mass, and still more preferably in a range of 20% by mass to 70% by mass of all of the polymerizable monomers included in the second transparent transfer layer.

To the second transparent transfer layer, it is possible to further add a variety of components depending on the purpose in addition to the resin and the polymerizable monomer.

As a random component, a polymerization initiator, a compound capable of reacting with an acid by heating, and the like are exemplified.

—Polymerization Initiator—

The second transparent transfer layer preferably includes a polymerization initiator and more preferably includes a photopolymerization initiator. In a case where the second transparent transfer layer includes the polymerization initiator in addition to the resin and the polymerizable monomer, it becomes easy to form a pattern in the second transparent transfer layer.

As the polymerization initiator, photopolymerization initiators described in Paragraphs 0031 to 0042 of JP2011-095716A are exemplified. As the photopolymerization initiator, for example, 1,2-octane dione, 1-[4-(phenylthio)-, 2-(O-benzoyloxime)] (trade name: IRGACURE OXE-01, manufactured by BASF), additionally, ethanone, 1-[9-ethyl-6-(2-methylbenzoyl)-9H-carbazole-3-yl]-, 1-(0-acetyloxime) (trade name: IRGACURE OXE-02, manufactured by BASF), 2-(dimethylamino)-2-[(4-methylphenyl)methyl]-1-[4-(4-morpholinyl)phenyl]-1-butanone (trade name: IRGACURE 379EG, manufactured by BASF), 2-methyl-1-(4-methyl thiophenyl)-2-morpholino propan-1-one (trade name: IRGACURE 907, manufactured by BASF), and the like are preferably exemplified.

In a case where the second transparent transfer layer includes the polymerization initiator, the content of the polymerization initiator is preferably 0.01% by mass or more and more preferably 0.1% by mass or more of the solid content of the second transparent transfer layer. In addition, the content is preferably 10% by mass or less and more preferably 5% by mass or less. In a case where the content of the polymerization initiator is in the above-described range, it is possible to further improve pattern formability in the transfer film and adhesiveness to transfer targets.

The second transparent transfer layer in the present disclosure is capable of further including at least one selected from a sensitizer or a polymerization inhibitor in order to adjust the curing sensitivity.

—Sensitizer—

The second transparent transfer layer in the present disclosure is capable of including a sensitizer.

The sensitizer has an action of further improving the sensitivity of a sensitizing dye, the polymerization initiator, or the like included in the second transparent transfer layer with respect to active radioactive rays, an action of suppressing the polymerization inhibition of the polymerizable compound by oxygen, or the like.

As an example of the sensitizer in the present disclosure, thiol and sulfide compounds, for example, thiol compounds described in JP1978-000702A (JP-S53-000702A), JP1980-500806B (JP-S55-500806B), and JP1993-142772A (JP-H5-142772A), disulfide compounds of JP1981-075643A (JP-S56-075643A), and the like are exemplified. More specifically, 2-mercaptobenzothiazole, 2-mercaptobenzoxazole, 2-mercaptobenzimidazole, 2-mercapto-4 (3H)-quinazoline, β-mercaptonaphthalene, and the like are exemplified.

As another example of the sensitizer in the present disclosure, amino acid compounds such as N-phenylglycine, organic metal compounds (for example, tributyl tin acetate and the like) described in JP1973-042965B (JP-S48-042965B), hydrogen donors described in JP1980-034414B (JP-S55-034414B), sulfur compounds (for example, trithianes and the like) described in JP1994-308727A (JP-H6-308727A), and the like are exemplified.

In a case where the second transparent transfer layer in the present disclosure includes the sensitizer, the content of the sensitizer is preferably in a range of 0.01% by mass to 30% by mass and more preferably in a range of 0.05% by mass to 10% by mass of the total solid content amount of the second transparent transfer layer from the viewpoint of further improving the curing rate due to the balance between the polymerization growth rate and the chain transfer.

In a case where the second transparent transfer layer in the present disclosure includes the sensitizer, the second transparent transfer layer may include only one kind of sensitizer or may include two or more kinds of sensitizers.

—Polymerization Inhibitor—

The second transparent transfer layer in the present disclosure is capable of including a polymerization inhibitor.

The polymerization inhibitor has a function of inhibiting the undesired polymerization of the polymerizable monomer while being produced or stored.

The polymerization inhibitor in the present disclosure is not particularly limited, and it is possible to use a well-known polymerization inhibitor depending on the purpose. As the well-known polymerization inhibitor, for example, hydroquinone, p-methoxyphenol, di-t-butyl-p-cresol, pyrogallol, t-butyl catechol, benzoquinone, 4,4'-thiobis(3-methyl-6-t-butylphenol), 2,2'-methylene bis(4-methyl-6-t-butylphenol), N-nitrosophenylhydroxyaminecerous salt, phenothiazine, phenoxazine, and the like are exemplified.

In a case where the second transparent transfer layer in the present disclosure includes the polymerization inhibitor, the amount of the polymerization inhibitor added is preferably 0.01% by mass to 20% by mass of the total solid content of the second transparent transfer layer.

In a case where the second transparent transfer layer in the present disclosure includes the polymerization inhibitor, only one kind of the polymerization inhibitor may be included or two or more kinds of the polymerization inhibitors may be included.

—Compound Capable of Reacting with Acid by Heating—

The second transparent transfer layer in the present disclosure may contain a compound capable of reacting with an acid by heating.

The compound capable of reacting with an acid by heating is preferably a compound having a higher reactivity with an acid after being heated at higher than 25° C. compared with the reactivity with an acid at 25° C. The compound capable of reacting with an acid by heating is preferably a compound which has a group capable of reacting with an acid that is temporarily inactivated by a blocking agent and from which a group derived from the blocking agent is dissociated at a predetermined dissociation temperature.

As the compound capable of reacting with an acid by heating, a carboxylic acid compound, an alcohol compound, an amine compound, blocked isocyanate, an epoxy compound, and the like can be exemplified, and blocked isocyanate is preferred.

As the blocked isocyanate that is used for the transfer film, commercially available blocked isocyanate can also be exemplified. For example, TAKENATE (registered trademark) B870N (manufactured by Mitsui Chemicals, Inc.) that is a methyl ethyl ketone oxime blocked body of isophorone diisocyanate, DURANATE (registered trademark) MF-K60B, TPA-B80E, X3071.04 (all manufactured by Asahi Kasei Corporation) that are hexamethylene diisocyanate-based blocked isocyanate compounds, and the like can be exemplified.

The weight-average molecular weight of the blocked isocyanate included in the second transparent transfer layer is preferably 200 to 3,000, more preferably 250 to 2,600, and particularly preferably 280 to 2,200.

The content of the blocked isocyanate is preferably in a range of 1% by mass to 30% by mass and more preferably in a range of 5% by mass to 20% by mass of the total solid content amount of the second transparent transfer layer from the viewpoint of handleability after transfer and before a heating step and low moisture permeability after the heating step.

—Particles—

The second transparent transfer layer preferably includes particles and, from the viewpoint of the refractive index and the transparency, more preferably includes metal oxide particles. In a case where the second transparent layer includes particles, it is possible to adjust the refractive index and light transmittance.

The kind of the metal oxide particles is not particularly limited, and well-known metal oxide particles can be used. Specifically, metal oxide particles that can be used in the first transparent transfer layer described below can be used in the second transparent transfer layer. Particularly, from the viewpoint of suppressing the refractive index of the second transparent transfer layer to be less than 1.6, the metal oxide particles are more preferably zirconium oxide particles or silicon dioxide particles and still more preferably silicon dioxide particles.

In addition, as other additives included in the second transparent transfer layer, for example, surfactants or well-known fluorine-based surfactants described in Paragraph 0017 of JP4502784B and Paragraphs 0060 to 0071 of JP2009-237362A, thermopolymerization inhibitors described in Paragraph 0018 of JP4502784B, and, furthermore, other additives described in Paragraphs 0058 to 0071 of JP2000-310706A are exemplified. As additives that are preferably used in the second transparent transfer layer, MEGAFACE (registered trademark) F551 (manufactured by DIC Corporation) which is a well-known fluorine-based surfactant is exemplified.

The second transparent transfer layer is formed by applying and drying a solution obtained by dissolving a resin composition for forming the second transparent transfer layer including at least the polymerizable monomer and the resin in a solvent (referred to as the coating fluid for forming the second transparent transfer layer).

(First Transparent Transfer Layer)

The first transparent transfer layer is a layer that is to be the first transparent layer after being transferred.

The first transparent transfer layer may be a layer including metal oxide particles and a resin or may be a layer that is cured by imparting energy. The first transparent transfer layer may be light-curable, heat-curable, or heat-curable and light-curable. Particularly, in a case where the first transparent transfer layer is a heat-curable and light-curable layer, it is possible to easily produce films.

In a case where the first transparent transfer layer is formed of a negative-type material, the first transparent transfer layer preferably includes, in addition to, the metal oxide particles and the resin (preferably an alkali-soluble resin), a polymerizable monomer and a polymerization initiator and may include other additives depending on the purpose.

The refractive index of the first transparent transfer layer is preferably 1.60 to 2.00, more preferably 1.63 to 1.90, and still more preferably 1.65 to 1.80.

The thickness of the first transparent transfer layer is preferably 20 nm to 200 nm and more preferably 40 nm to 100 nm.

A method for controlling the refractive index of the first transparent transfer layer is not particularly limited, and a method of singly using a transparent resin layer having a desired refractive index, a method of using a transparent resin layer to which particles such as metal particles or metal oxide particles are added, a method of using a complex of a metal salt and a polymer, and the like are exemplified.

—Resin—

The first transparent transfer layer preferably includes a resin.

The resin may have a function as a binder. As the resin, an alkali-soluble resin is preferred. The detail of the alkali-soluble resin is the same as that of the alkali-soluble resin in the second transparent transfer layer.

Among them, a resin having a configurational unit derived from at least one kind of (meth)acrylic acid or (meth)acrylic acid ester ((meth)acrylic resin) is preferred, and a (meth)acrylic resin having a configurational unit derived from (meth)acrylic acid and a configurational unit derived from allyl (meth)acrylate is more preferred. In addition, in the first transparent transfer layer, ammonium salts of a resin having an acidic group can be exemplified as examples of a preferred resin.

A composition for forming the first transparent transfer layer may include the ammonium salt of a monomer having an acidic group as a curable component.

—Ammonium Salt of Resin Having Acidic Group—

The ammonium salt of a resin having an acidic group is not particularly limited, and ammonium salts of a (meth) acrylic resin are preferably exemplified.

At the time of preparing the composition for forming the first transparent transfer layer, a step of dissolving the resin having an acidic group in an ammonia aqueous solution and preparing a coating fluid for forming the first transparent transfer layer including a resin in which at least some of acidic groups is ammonium-chlorinated is preferably included.

—Resin Having Acidic Group—

The resin having an acidic group is a resin that is soluble in an aqueous solvent (preferably water or a mixed solvent of a lower alcohol having 1 to 3 carbon atoms and water), and can be appropriately selected from well-known resins without any particular limitation. As a preferred example of the resin having an acidic group, resins having a monovalent acidic group (carboxyl group or the like) are exemplified. The resin included in the first transparent transfer layer is particularly preferably a resin having a carboxyl group.

The resin having an acidic group is preferably an alkali-soluble resin.

The alkali-soluble resin is a linear organic high molecular weight polymer and can be appropriately selected from polymers having at least one group that accelerates alkali solubility in the molecule. As the group that accelerates alkali solubility, that is, the acidic group, for example, a carboxyl group, a phosphoric acid group, a sulfonic acid group, and the like are exemplified, and a carboxyl group is preferred.

As the alkali-soluble resin, copolymers including a structural unit selected from (meth)acrylic acid and styrene in a main chain are preferably exemplified. As the alkali-soluble resin, resins that are soluble in an organic solvent and can be developed by a weak alkali aqueous solution are more preferably exemplified.

In addition, the resin having an acidic group is preferably a (meth)acrylic resin having an acidic group, more preferably a copolymer resin of (meth)acrylic acid and a vinyl compound, and particularly preferably a copolymer resin of (meth)acrylic acid and allyl (meth)acrylate.

Particularly, the first transparent transfer layer preferably includes, as the resin, a copolymer having a structural unit derived from (meth)acrylic acid and a structural unit derived from styrene and more preferably includes a copolymer having a structural unit derived from (meth)acrylic acid, a structural unit derived from styrene, and a structural unit derived from (meth)acrylic acid ester having an ethyleneoxy chain.

The resin that is used for the first transparent transfer layer includes a structural unit derived from (meth)acrylic acid and a structural unit derived from styrene or includes a copolymer having a structural unit derived from (meth) acrylic acid, a structural unit derived from styrene, and a structural unit derived from (meth)acrylic acid ester having an ethyleneoxy chain, and thus film thickness uniformity at the time forming the first transparent transfer layer becomes favorable.

As the resin having an acidic group, a commercially available product may be used. The commercially available product of the resin having an acidic group is not particularly limited and can be appropriately selected according to the purpose. As the commercially available product of the resin having an acidic group, for example, ARUFON (registered trademark) UC3000, UC3510, UC3080, UC3920, UF5041 (all trade name) manufactured by Toagosei Co., Ltd., JONCRYL (registered trademark) 67, JONCRYL 611, JONCRYL 678, JONCRYL 690, JONCRYL 819 (all trade name) manufactured by BASF, and the like are exemplified.

The content of the resin having an acidic group is preferably 10% by mass to 80% by mass, more preferably 15% by mass to 65% by mass, and particularly preferably 20% by mass to 50% by mass of the first transparent transfer layer.

—Other Resins—

The first transparent transfer layer may further include other resins having no acidic group. Other resins having no acidic group are not particularly limited.

—Metal Oxide Particles—

The first transparent transfer layer preferably includes metal oxide particles. In a case where the first transparent transfer layer includes metal oxide particles, it is possible to adjust the refractive index and the light transmittance.

The first transparent transfer layer is capable of including metal oxide particles in a random proportion depending on the kinds and contents of the resin and the polymerizable monomer being used, the kind of the metal oxide particles, and the like.

The kind of the metal oxide particles is not particularly limited, and well-known metal oxide particles can be used. From the viewpoint of transparency and the viewpoint of controlling the refractive index to be in a range of the refractive index of the first transparent transfer layer, the first transparent transfer layer preferably contains at least one of zirconium oxide particles ($ZrO_2$ particles), $Nb_2O_5$ particles, titanium oxide particles ($TiO_2$ particles), or silicon dioxide particles ($SiO_2$ particles). Among these, from the viewpoint of easiness in adjusting the refractive index of the transfer layer to 1.6 or higher, the metal oxide particles in the first transparent transfer layer are more preferably zirconium oxide particles or titanium oxide particle and still more preferably zirconium oxide particles.

As the silicon dioxide particles, for example, colloidal silica, fumed silica, and the like are exemplified, and as examples of commercially available products on the market, SNOWTEX ST-N (colloidal silica; non-volatile content: 20%) and SNOWTEX ST-C (colloidal silica; non-volatile content: 20%) manufactured by Nissan Chemical Corporation), and the like are exemplified.

As examples of the zirconium oxide particles, NANOUSE OZ-S30M (methanol dispersion liquid, non-volatile content: 30.5% by mass) manufactured by Nissan Chemical Corporation, SZR-CW (water dispersion liquid, non-volatile content: 30% by mass) and SZR-M (methanol dispersion liquid, non-volatile content: 30% by mass) manufactured by Sakai Chemical Industry Co., Ltd., and the like are exemplified.

As examples of the titanium oxide particles, TS-020 (water dispersion liquid, non-volatile content: 25.6% by mass) manufactured by Teika Pharmaceutical Co., Ltd., TITANIA SOL R (methanol dispersion liquid, non-volatile content: 32.1% by mass) manufactured by Nissan Chemical Corporation, and the like are exemplified.

In a case where zirconium oxide particles are used as the metal oxide particles, the content of the zirconium oxide particles is preferably 1% by mass to 95% by mass, more preferably 20% by mass to 90% by mass, and still more preferably 40% by mass to 85% by mass of the total solid content mass of the first transparent transfer layer since a defect in a second resin layer having the metal oxide particles is not easily observed after transfer, and it is possible to produce a laminate having a favorable transparent electrode pattern-covering property.

In a case where titanium oxide particles are used as the metal oxide particles, the content of the titanium oxide particles is preferably 1% by mass to 95% by mass, more preferably 20% by mass to 90% by mass, and still more preferably 40% by mass to 85% by mass of the total solid content mass of the first transparent transfer layer since a defect in the first transparent transfer layer having the metal oxide particles is not easily observed after transfer, and it is possible to produce a laminate having a favorable transparent electrode pattern-covering property.

The refractive index of the metal oxide particle is preferably higher than the refractive index of a transparent film formed of a composition obtained by removing the metal oxide particles from the coating fluid for forming the first transparent transfer layer.

Specifically, the first transparent transfer layer of the transfer film preferably contains metal oxide particles having a refractive index of 1.5 or higher, more preferably contains particles having a refractive index of 1.55 or higher, still more preferably contains particles having a refractive index of 1.7 or higher, particularly preferably contains particles having a refractive index of 1.9 or higher, and most preferably contains particles having a refractive index of 2 or higher.

Here, the refractive index being 1.5 or higher means that the average refractive index for light having a wavelength of 550 nm is 1.5 or higher. The average refractive index is a value obtained by dividing the sum of the measurement values of the refractive index for light having a wavelength of 550 nm by the number of measurement points.

The average primary particle diameter of the metal oxide particles is preferably 100 nm or less, more preferably 50 nm or less, and still more preferably 20 nm or less from the viewpoint of optical performance such as haze.

The average primary particle diameter of the metal oxide particles is a value obtained by measuring the diameters of 100 random particles by observation using a transmission electron microscope (TEM) and arithmetically averaging the 100 diameters.

The first transparent transfer layer may singly include one kind of the metal oxide particles or may include two or more kinds of the metal oxide particles.

The content of the metal oxide particles in the first transparent transfer layer is preferably 1% by mass to 95% by mass, more preferably 20% by mass to 90% by mass, and still more preferably 40% by mass to 85% by mass of the total solid content mass of the first transparent transfer layer regardless of the kind of the metal oxide particles. In a case where the content of the metal oxide particles is in the above-described range, the transparent electrode pattern-covering property after transfer further improves.

The first transparent transfer layer is capable of including other components in addition to the resin and the metal oxide particles.

—Metal Oxidation Suppressor—

The first transparent transfer layer preferably includes a metal oxidation suppressor.

The metal oxidation suppressor is preferably a compound having an aromatic ring including a nitrogen atom in the molecule.

In addition, in the metal oxidation suppressor, the aromatic ring including a nitrogen atom is preferably at least one ring selected from the group consisting of an imidazole ring, a triazole ring, a tetrazole ring, a thiadiazole ring, or a fused ring of the above-described ring and another aromatic ring, and the aromatic ring including a nitrogen atom is more preferably an imidazole ring or a fused ring of an imidazole ring and another aromatic ring.

The another aromatic ring may be a carbon ring or a heterocyclic ring, but is preferably a carbon ring, more preferably a benzene ring or a naphthalene ring, and still more preferably a benzene ring.

As a preferred metal oxidation suppressor, imidazole, benzimidazole, tetrazole, mercapto thiadiazole, and benzotriazole are preferably exemplified, and imidazole, benzimidazole, and benzotriazole are more preferred. As the metal oxidation suppressor, a commercially available product may be used, and it is possible to use, for example, BT120 including benzotriazole manufactured by Johoku Chemical Co., Ltd. and the like.

In addition, the content of the metal oxidation suppressor is preferably 0.1% by mass to 20% by mass, more preferably 0.5% by mass to 10% by mass, and still more preferably 1% by mass to 5% by mass of the total mass of the first transparent transfer layer.

—Polymerizable Monomer—

The first transparent transfer layer preferably includes a polymerizable monomer such as a polymerizable monomer or a thermopolymerizable monomer from the viewpoint of increasing the strength or the like of a film by curing the first transparent transfer layer. The first transparent transfer layer may include only the above-described monomer having an acidic group as the polymerizable monomer.

As the polymerizable monomer that is used in the first transparent transfer layer, it is possible to use the polymerizable compounds described in Paragraphs 0023 and 0024 of JP4098550B. Among them, pentaerythritol tetraacrylate, pentaerythritol triacrylate, and tetraacrylate of a pentaerythritol ethylene oxide adduct can be preferably used. These polymerizable monomers may be used singly or a plurality of the polymerizable monomers may be used in combination. In the case of using a mixture of pentaerythritol tetraacrylate and pentaerythritol triacrylate, the ratio of pentaerythritol triacrylate is preferably 0% to 80% and more preferably 10% to 60% in terms of the mass ratio.

As the polymerizable monomer that is used in the first transparent transfer layer, water-soluble polymerizable monomers represented by Structural Formula 1 below, a pentaerythritol tetraacrylate mixture (NK ESTER A-TMMT: manufactured by Shin-Nakamura Chemical Co., Ltd., containing approximately 10% of triacrylate as an impurity), a mixture of pentaerythritol tetraacrylate and triacrylate (NK ESTER A-TMM3LM-N manufactured by Shin-Nakamura Chemical Co., Ltd., 37% of triacrylate), a mixture of pentaerythritol tetraacrylate and triacrylate (NK ESTER A-TMM-3L manufactured by Shin-Nakamura Chemical Co., Ltd., 55% of triacrylate), a mixture of pentaerythritol tetraacrylate and triacrylate (NK ESTER A-TMM3 manufactured by Shin-Nakamura Chemical Co., Ltd., 57% of triacrylate), tetraacrylate of a pentaerythritol ethylene oxide adduct (KAYARAD RP-1040 manufactured by Nippon Kayaku Co., Ltd.), and the like can be exemplified.

Structural Formula 1

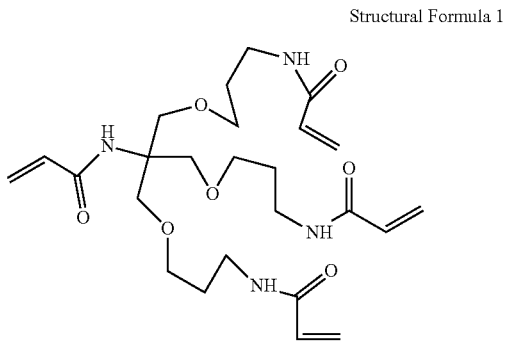 [SMILES: C=CC(=O)NCCCOCC(COCCCNC(=O)C=C)(COCCCNC(=O)C=C)NC(=O)C=C]

As other polymerizable monomers that are used in the first transparent transfer layer, polymerizable monomers that are soluble in an aqueous solvent such as water or a solvent mixture of a lower alcohol having 1 to 3 carbon atoms and water and monomers having an acidic group are preferred. As the polymerizable monomers that are soluble in an aqueous solvent, monomers having a hydroxyl group and monomers having an ethylene oxide or a polypropylene oxide and a phosphoric acid group in the molecule are exemplified. As the monomers having an acidic group, polymerizable monomers containing a carboxyl group are preferred, acrylic monomers such as (meth)acrylate or derivatives thereof can be more preferably used, and, among them, ARONIX TO-2349 (Toagosei Co., Ltd.) is particularly preferred.

—Polymerization Initiator—

The first transparent transfer layer is capable of including a polymerization initiator.

The polymerization initiator that is used in the first transparent transfer layer is preferably a polymerization initiator that is soluble in an aqueous solvent. As the polymerization initiator that is soluble in an aqueous solvent, IRGACURE 2959, photopolymerization initiators of Structural Formula 2 below, and the like are exemplified.

Structural Formula 2

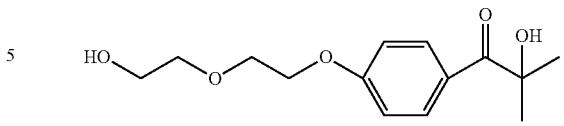

Hitherto, a case where the transfer film is a negative-type material has been mainly described, but the transfer film may be a positive-type material. In a case where the transfer film is a positive material, a material described in, for example, JP2005-221726A can be used for the first transparent transfer layer, but the material is not limited thereto.

The coating fluid for forming the first transparent transfer layer that is used to form the first transparent transfer layer is capable of including a solvent.

As the solvent, for example, diacetone alcohol (3.2 mPa·s), ethylene glycol (32.5 mPa·s), propylene glycol (56 mPa·s), isobutyl alcohol (4.2 mPa·s), and the like are exemplified.

(Third Transparent Transfer Layer)

The third transparent transfer layer is a layer that is to be the third transparent layer after being transferred.

The refractive index and thickness of the third transparent transfer layer are the same as those of the above-described third transparent layer. Specifically, in an aspect of forming a covering layer made up of three or more layers, the refractive index is preferably 1.5 to 2.4 and more preferably 1.7 to 2.35. In addition, in an aspect in which the covering layer has a two-layer structure, the refractive index is preferably 1.5 to 1.75 and more preferably 1.65 to 1.7.

The thickness of the third transparent transfer layer is 300 nm or less, preferably 20 nm to 300 nm, and more preferably 50 nm to 80 nm in a case where the covering layer made up of two or more layers is formed on the second wire portion (bridge wire) 18. In addition, in an aspect in which the covering layer has a three-layer structure, the thickness of the third transparent layer is preferably 10 nm to 100 nm and more preferably 10 nm to 50 nm.

The third transparent transfer layer can be formed in the same manner as the first transparent transfer layer intended to transfer and form the above-described first transparent layer.

As components that are used in the third transparent transfer layer, it is possible to use the same components as the components that can be used for the first transparent transfer layer.

(Fourth Transparent Transfer Layer)

The fourth transparent transfer layer is a layer that is to be the fourth transparent layer after being transferred.

The refractive index and thickness of the fourth transparent transfer layer are the same as those of the above-described fourth transparent layer. Specifically, the fourth transparent transfer layer is preferably a transparent layer having a refractive index lower than the refractive index of the third transparent transfer layer and a thickness of 0.5 μm or more. The refractive index of the fourth transparent transfer layer is preferably 1.4 to 1.6 and more preferably 1.45 to 1.55. In addition, the thickness of the fourth transparent layer is preferably 0.5 μm or more and more preferably 0.5 μm to 20 μm.

The fourth transparent transfer layer can be formed in the same manner as the second transparent transfer layer intended to transfer and form the above-described second transparent layer.

As components that are used in the fourth transparent transfer layer, it is possible to use the same components as the components that can be used for the second transparent transfer layer.

(Fifth Transparent Transfer Layer)

The fifth transparent transfer layer is a high-refractive index layer having a refractive index value close to that of the third transparent layer and a layer that is to be the fifth transparent layer after being transferred.

The refractive index and thickness of the fifth transparent transfer layer are the same as those of the above-described fifth transparent layer. Specifically, the refractive index is more preferably 1.6 to 1.9 and more preferably 1.6 to 1.7. In addition, the thickness of the fifth transparent transfer layer is preferably 200 nm or less and more preferably 40 nm to 200 nm.

The fifth transparent transfer layer can be formed in the same manner as the first transparent transfer layer intended to transfer and form the above-described first transparent layer.

(Sixth Transparent Transfer Layer)

The sixth transparent transfer layer is a low-refractive index layer having a refractive index value lower than that of the third transparent layer and a layer that is to be the sixth transparent layer after being transferred.

The refractive index and thickness of the sixth transparent transfer layer are the same as those of the above-described sixth transparent layer.
Specifically, the sixth transparent transfer layer is preferably 1.6 or less in refractive index and 200 nm or less in thickness.

The sixth transparent transfer layer can be formed using the same components as those of the first transparent transfer layer for transferring and forming the above-described first transparent layer except for the fact that particles having a low refractive index are preferably used from the viewpoint of adjusting the refractive index to be low.

As the particles having a low refractive index, silicon dioxide and inorganic particles such as hollow particles are preferred, and, for example, colloidal silica, fumed silica, hollow silica, and the like are exemplified. As examples of commercially available products on the market, SNOWTEX (registered trademark) ST-N (colloidal silica; non-volatile content: 20%) and SNOWTEX ST-C (colloidal silica; non-volatile content: 20%) manufactured by Nissan Chemical Corporation), THRULYA 1110 (hollow silica) manufactured by JGC Catalysts and Chemicals Ltd., SILINAX (hollow silica) manufactured by Nittetsu Mining Co., Ltd., and the like are exemplified.

(Seventh Transparent Transfer Layer)

The seventh transparent transfer layer is a low-refractive index layer having a refractive index value lower than that of the first transparent layer and a layer that is to be the seventh transparent layer after being transferred.

The refractive index and thickness of the seventh transparent transfer layer are the same as those of the above-described seventh transparent layer. Specifically, the refractive index is preferably 1.5 or less. In addition, the thickness is preferably 200 nm or less and more preferably 50 nm or less.

The seventh transparent transfer layer can be formed using the same components as those of the first transparent transfer layer for transferring and forming the above-described first transparent layer except for the fact that particles having a low refractive index are preferably used from the viewpoint of adjusting the refractive index to be low.

The particles having a low refractive index are the same as the particles in the sixth transparent transfer layer, and, for example, silicon dioxide and inorganic particles such as hollow particles are preferred.

The transfer material may have, in addition to a variety of transparent transfer layers described above, other random layers such as a thermoplastic resin layer, an interlayer, and a protective film as long as the effect is not impaired.

The method for manufacturing the touch sensor of the embodiment of the present disclosure preferably has a step of forming through-holes in the first transparent layer and the second transparent layer formed in the first transparent layer-forming step and the second transparent layer-forming step.

In a case where the first transparent transfer layer and the second transparent transfer layer are formed of a photosensitive material, the through-holes can be formed by exposing a photosensitive layer formed of the photosensitive material in a pattern shape and developing the photosensitive layer. In addition, in a case where the first transparent transfer layer and the second transparent transfer layer are not photosensitive, it is possible to form the first transparent transfer layer and the second transparent transfer layer and then form the through-holes using an etching method in which a so-called etching resist is used.

In addition, the method for manufacturing the touch sensor of the embodiment of the present disclosure may have a step of further forming an overcoat layer on the third transparent layer and the fourth transparent layer formed in the third transparent layer-forming step and the fourth transparent layer-forming step as shown in FIG. 3.

A method for exposing a material for forming a layer in a pattern shape is not particularly limited, and the material may be exposed by surface exposure in which a photomask is used or may be exposed by scanning and exposing the material using laser beams or the like. In addition, the material may be exposed by refraction-type exposure in which a lens is used or may be exposed by reflection-type exposure in which a reflection mirror is used. In addition, the material may be exposed using an exposure method such as contact exposure, proximity exposure, reduced projection exposure, or reflection projection exposure. A light source is preferably a g ray, an h ray, an i ray, a j ray, or the like. As the kind of the light sources, for example, a metal halide lamp, a high-pressure mercury lamp, and a light emitting diode (LED) are exemplified.

In addition, in development after exposure, an alkali developer is generally used.

<Image Display Device>

The image display device of the embodiment of the present disclosure includes the above-described touch sensor of the embodiment of the present disclosure. Therefore, the visibility of patterns derived from internal electrode wires in an image display portion of the image display device is improved, and a favorable display screen in terms of appearance is formed.

The image display device is a display device including a touch panel such as an electrostatic capacitance-type input device, and examples thereof include an organic electroluminescence (EL) display device, a liquid crystal display device, and the like.

EXAMPLES

Hereinafter, the embodiment of the present invention will be more specifically described using examples. However, the embodiment of the present invention is not limited to the following examples within the scope of the gist of the present invention. Unless particularly otherwise described, "parts" and "%" are mass-based.

Compositional ratios in a polymer are molar ratios unless particularly otherwise described.

In addition, unless particularly otherwise described, refractive indexes are values measured using an ellipsometer at a wavelength of 550 nm.

In addition, in examples described below, the weight-average molecular weight of a resin was measured by gel permeation chromatography (GPC) under the following conditions. A calibration curve was produced from "standard specimen TSK standard, polystyrene" manufactured by Tosoh Corporation: eight samples of "F-40", "F-20", "F-4", "F-1", "A-5000", "A-2500", "A-1000", and "n-propylbenzene".

<Conditions>
GPC: HLC (registered trademark)-8020GPC (manufactured by Tosoh Corporation)
Column: Three TSKgel (registered trademark), Super Multipore HZ-H (manufactured by Tosoh Corporation, 4.6 mmID×15 cm)
Eluent: Tetrahydrofuran (THF)
Specimen concentration: 0.45% by mass
Flow rate: 0.35 ml/min
Sample injection amount: 10 μl
Measurement temperature: 40° C.
Detector: Differential refractometer (RI)
<Preparation of Coating Fluids for Forming Second Transparent Transfer Layer>

Materials A-1 to A-4 that were coating fluids for forming a second transparent transfer layer were prepared according to components and contents which forms compositions shown in Table 1 below.

TABLE 1

|  | Raw material | Material A-1 | Material A-2 | Material A-3 | Material A-4 |
|---|---|---|---|---|---|
| Particles | Zirconia dispersion liquid ZR-010 (manufactured by Solar Co., Ltd.) | — | 19.33 | 24.17 | — |
|  | Colloidal silica sol: MEK-ST-40 (manufactured by Nissan Chemical Corporation) | — | — | — | 29.00 |
| Photopolymerizable compound | Tricyclodecane dimethanol diacrylate (A-DCP, manufactured by Shin-Nakamura Chemical Co., Ltd.) | 5.60 | — | — | 3.02 |
|  | Carboxylic acid-containing monomer ARONIX TO-2349 (manufactured by Toagosei Co., Ltd.) | 0.93 | — | — | 0.63 |
|  | Urethane acrylate 8UX-015A (manufactured by Taisei Fine Chemical Co., Ltd.) | 2.80 | — | — | — |
|  | DPHA liquid (dipentaerythritol hexaacrylate: 38%, dipentaerythritol pentaacrylate: 38%, 1-methoxy-2-porpyl acetate: 24%) | — | 3.51 | 3.25 | — |
|  | UK OLIGO UA-32P (manufactured by Shin-Nakamura Chemical Co., Ltd.) | — | 1.67 | 1.55 | — |
|  | VISCOAT #802 (manufactured by Osaka Organic Chemical Industry Ltd.) | — | 4.42 | 4.09 | — |
|  | X-12-2430C (manufactured by Shin-Etsu Chemical Co., Ltd.) | — | — | — | 1.51 |
| Binder polymer | Compound A below (acid value: 95 mgKOH/g, Mw: 29000, Mn: 13700) | 15.59 | 10.43 | 9.66 | 8.33 |
| Photopolymerization initiator | Ethanone, 1-[9-ethy1-6-(2-methylbenzoyl)-9H-carbazole-3-yl]-, 1-(0-acetyloxime) (OXE-02, manufactured by BASF) | 0.11 | — | — | 0.06 |
|  | 2-Methyl-1-(4-methyl thiophenyl)-2-morpholino propan-1-one (Irgacure 907, manufactured by BASF) | 0.21 | — | — | 0.12 |
|  | 2-Benzyl-2-dimethylamino-1-(4-morpholinophenyl)-butanone (Irgacure 379, manufactured by BASF) | — | 0.38 | 0.35 | — |
|  | KAYACURE-DETX-S (manufactured by Nippon Kayaku Co., Ltd.) | — | 0.38 | 0.35 | — |
| Sensitizer | N-phenylglycine (manufactured by Yodo Kagaku Co., Ltd.) | 0.03 | 0.03 | 0.03 | 0.03 |
| Blocked isocyanate | DURANATE WT32-B75P (manufactured by Asahikasei Chemicals. Corporation) | 3.63 | — | — | — |
|  | AOI-BM (manufactured by Showa Denko K.K.) | — | 3.63 | 3.63 | 3.63 |
| Additives | MEGAFACE F551 (manufactured by DIC Corporation) | 0.02 | 0.02 | 0.02 | 0.02 |
|  | 1,2,4-Triazole (manufactured by Otsuka Chemical Co., Ltd.) | 0.09 | 0.09 | 0.09 | 0.09 |
| Solvent | 1-Methoxy-2-propyl acetate | 31.08 | 30.00 | 30.00 | 30.00 |
|  | Methyl ethyl ketone | 40.00 | 26.20 | 22.90 | 23.65 |
| Total (parts by mass) |  | 100 | 100 | 100 | 100 |

Compound A: Mw29000, Mn = 13700

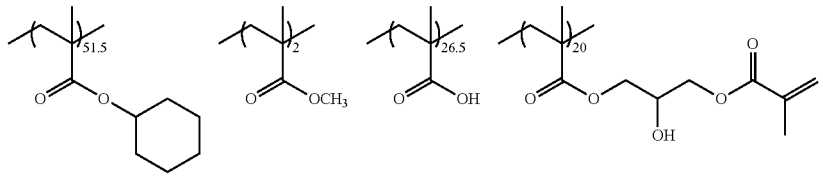

<Preparation of Coating Fluid for Forming First Transparent Transfer Layer>

Next, Materials B-1 to B-4 that were coating fluids for forming a first transparent transfer layer were prepared according to components and contents forming compositions shown in Table 2 below.

TABLE 2

| Raw material | | Material B-1 | Material B-2 | Material B-3 | Material B-4 |
|---|---|---|---|---|---|
| NANOUSE OZ-S30M: $ZrO_2$ particles, methanol dispersion liquid (non-volatile content: 30.5%), manufactured by Nissan Chemical Corporation | | 4.34 | 4.00 | — | — |
| Colloidal silica SNOWTEX ST-N (non-volatile content: 20%) manufactured by Nissan Chemical Corporation | | — | — | 3.00 | — |
| TS-020: $TiO_2$ particles, water dispersion liquid (non-volatile content: 25.6%) manufactured by Teika Pharmaceutical Co., Ltd. | | — | — | — | 3.50 |
| Ammonia water (25%) | | 7.82 | 7.82 | 2.9 | 7.82 |
| Monoisopropanolamine (manufactured by Mitsui Fine Chemicals, Inc.) | | 0.02 | 0.02 | 0.02 | 0.02 |
| Binder polymer | Copolymer resin of methacrylic acid and allyl methacrylate (Mw: 38,000, Mn: 8,500, compositional ratio = 40/60 (molar ratio)) | 0.24 | 0.34 | 0.44 | 0.40 |
| | Compound B below (Mw: 15500) | 0.01 | 0.01 | 0.01 | 0.01 |
| Carboxylic acid-containing monomer ARONIX TO-2349 (manufactured by Toagosei Co., Ltd.) | | 0.03 | 0.03 | 0.03 | 0.03 |
| Benzotriazole BT-LX (manufactured by Johoku Chemical Co., Ltd.) | | 0.03 | 0.03 | 0.03 | 0.03 |
| MEGAFACE F444 (manufactured by DIC Corporation) | | 0.01 | 0.01 | 0.01 | 0.01 |
| Ion exchange water | | 21.5 | 19.7 | 33.6 | 25.2 |
| Methanol | | 66.0 | 68.0 | 60.0 | 63.0 |
| Total (parts by mass) | | 100 | 100 | 100 | 100 |

Compound B

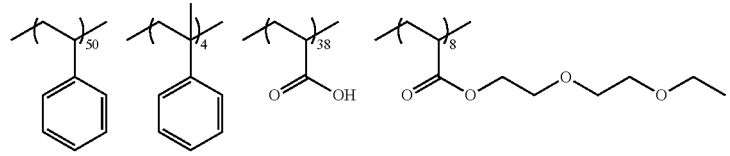

<Production of Transfer Films for Protecting Pattern Electrodes>

—Transfer Film for Protecting Pattern Electrodes 1 (Examples 1 to 13, 15, and Comparative Example 2)—

Material A-1, A-2, or A-4 was applied for the purpose of forming the second transparent transfer layer onto a temporary support that was a 16 μm-thick polyethylene terephthalate (PET) film using a slit-shaped nozzle at an application amount adjusted to obtain a film thickness after drying of 3 μm. After the application, a solvent in the applied film was volatilized in a drying zone (80° C.), thereby forming a second transparent transfer layer. Material B-1 for forming the first transparent transfer layer was applied onto the second transparent transfer layer using the slit-shaped nozzle at an application amount adjusted to obtain a film thickness after drying shown in Table 4 so as to form a combination in Table 4 below. After that, the applied film was dried at a drying temperature of 70° C., thereby forming a first transparent transfer layer.

Next, a 16 μm-thick polyethylene terephthalate film was attached by pressure to a surface of the first transparent transfer layer as a protective film.

A transfer film for protecting pattern electrodes 1 having a laminate structure of the protective film/the first transparent transfer layer (first transparent layer)/the second transparent transfer layer (second transparent layer)/the temporary support was produced in the above-described manner.

—Transfer Film for Protecting Pattern Electrodes 2 (Example 14)—

Material A-1 was applied for the purpose of forming the second transparent transfer layer onto a temporary support that was a 16 μm-thick polyethylene terephthalate (PET) film using a slit-shaped nozzle at an application amount adjusted to obtain a film thickness after drying of 3 μm. After the application, a solvent in the applied film was volatilized in a drying zone (80° C.), thereby forming a second transparent transfer layer. Material B-4 for forming the first transparent transfer layer was applied onto the second transparent transfer layer using the slit-shaped nozzle at an application amount adjusted to obtain a film thickness after drying shown in Table 4 so as to form a combination in Table 4 below. After that, the applied film was dried at a drying temperature of 70° C., thereby forming a first transparent transfer layer.

Next, Material B-3 was applied onto the first transparent transfer layer using the slit-shaped nozzle at an application amount adjusted to obtain a film thickness after drying shown in Table 4, and then an applied film was dried at a drying temperature of 70° C., thereby forming a seventh transparent transfer layer.

Next, a 16 μm-thick polyethylene terephthalate film was attached by pressure to a surface of the seventh transparent transfer layer as a protective film.

A transfer film for protecting pattern electrodes 2 having a laminate structure of the protective film/the seventh transparent transfer layer (seventh transparent layer)/the first transparent transfer layer (first transparent layer)/the second transparent transfer layer (second transparent layer)/the temporary support was produced in the above-described manner.

—Transfer Film for Protecting Pattern Electrodes 3 (Example 16 and Comparative Example 1)—

Material A-1 was applied for the purpose of forming the second transparent transfer layer onto a temporary support that was a 16 μm-thick polyethylene terephthalate (PET) film using a slit-shaped nozzle at an application amount adjusted to obtain a film thickness after drying of 3 μm. After the application, a solvent in the applied film was volatilized in a drying zone (80° C.), thereby forming a second transparent transfer layer. Next, a 16 μm-thick polyethylene terephthalate film was attached by pressure to a surface of the second transparent transfer layer as a protective film.

A transfer film for protecting pattern electrodes 3 having a laminate structure of the protective film/the second transparent transfer layer (second transparent layer)/the temporary support was produced in the above-described manner.

<Production of Transfer Films for Protecting Bridge Wire>

—Transfer Film for Protecting Bridge Wire 1 (Examples 1 to 7, 15 and 16, and Comparative Example 2)—

Any of Material A-1 to A-4 was applied for the purpose of forming the fourth transparent transfer layer onto a temporary support that was a 16 μm-thick polyethylene terephthalate (PET) film using a slit-shaped nozzle at an application amount adjusted to obtain a film thickness after drying of 5 μm, and a solvent in the applied film was volatilized in a drying zone (80° C.), thereby forming a fourth transparent transfer layer. Material B-2, B-3, or B-4 for forming the third transparent transfer layer was applied onto the fourth transparent transfer layer using the slit-shaped nozzle at an application amount adjusted so that a film thickness after drying reached a film thickness in Table 4 so as to form a combination in Table 4 below. After that, the applied film was dried at a drying temperature of 70° C., thereby forming a third transparent transfer layer.

Next, a 16 μm-thick polyethylene terephthalate film was attached by pressure to a surface of the third transparent transfer layer as a protective film.

A transfer film for protecting a bridge wire 1 having a laminate structure of the protective film/the third transparent transfer layer (third transparent layer)/the fourth transparent transfer layer (fourth transparent layer)/the temporary support was produced in the above-described manner.

—Transfer Film for Protecting Bridge Wire 2 (Examples 8 and 10 to 14)—

Any of Material A-1, A-2, and A-4 was applied for the purpose of forming the fourth transparent transfer layer onto a temporary support that was a 16 μm-thick polyethylene terephthalate (PET) film using a slit-shaped nozzle at an application amount adjusted to obtain a film thickness after drying of 5 μm, and a solvent in the applied film was volatilized in a drying zone (80° C.), thereby forming a fourth transparent transfer layer. Material B-2 or B-4 for forming the third transparent transfer layer was applied onto the fourth transparent transfer layer using the slit-shaped nozzle at an application amount adjusted so that a film thickness after drying reached a film thickness in Table 4 so as to form a combination in Table 4 below. After that, the applied film was dried at a drying temperature of 70° C., thereby forming a third transparent transfer layer.

Next, Material B-3 was applied onto the third transparent transfer layer using the slit-shaped nozzle at an application adjusted to obtain a film thickness after drying shown in Table 4, and then an applied film was dried at a drying temperature of 70° C., thereby forming a sixth transparent transfer layer.

Next, a 16 μm-thick polyethylene terephthalate film was attached by pressure to a surface of the sixth transparent transfer layer as a protective film.

A transfer film for protecting a bridge wire 2 having a laminate structure of the protective film/the sixth transparent transfer layer (sixth transparent layer)/the third transparent transfer layer (third transparent layer)/the fourth transparent transfer layer (fourth transparent layer)/the temporary support was produced in the above-described manner.

—Transfer Film for Protecting Bridge Wire 3 (Example 9)—

Material A-1 was applied for the purpose of forming the third transparent transfer layer onto a temporary support that was a 16 μm-thick polyethylene terephthalate (PET) film using a slit-shaped nozzle at an application amount adjusted to obtain a film thickness after drying of 5 μm, and a solvent in the applied film was volatilized in a drying zone (80° C.), thereby forming a fourth transparent transfer layer.

Next, a 16 μm-thick polyethylene terephthalate film was attached by pressure to a surface of the fourth transparent transfer layer as a protective film.

A transfer film for protecting a bridge wire 3 having a laminate structure of the protective film/the fourth transparent transfer layer (fourth transparent layer)/the temporary support was produced in the above-described manner.

<Production of Transfer Film for Overcoat>

Material A-1 was applied onto a temporary support that was a 16 μm-thick polyethylene terephthalate (PET) film using a slit-shaped nozzle at an application amount adjusted so that the film thickness after drying reached 10 μm, and an applied film was dried at a temperature of 80° C., thereby forming an overcoat layer.

A protective film (12 μm-thick polypropylene film) was attached by pressure to a surface of the formed overcoat layer, thereby producing a transfer film for an overcoat.

<Production of Transparent Film-Attached Base Material>

A corona discharge treatment was carried out on a cycloolefin resin film having a film thickness of 38 μm and a refractive index of 1.53 using a high-frequency oscillator for three seconds under the following conditions to modify a surface, thereby producing a transparent film substrate (transparent base material).

<Conditions>

Output voltage: 100%

Output: 250 W

Electrode: wire electrode having a diameter of 1.2 mm

Electrode length: 240 mm

Distance between work electrodes: 1.5 mm

Next, Material-C shown in Table 3 below was applied to the corona discharge treatment surface of the transparent film substrate using a slit-shaped nozzle. After that, the material was irradiated with ultraviolet rays (integrated light quantity: 300 mJ/cm$^2$) and dried at approximately 110° C., thereby forming a transparent film having a refractive index of 1.60 and a film thickness of 80 nm (the fifth transparent layer 32 shown in FIG. 3).

A transparent film-attached base material (reference 10A shown in FIG. 3) was produced in the above-described manner.

TABLE 3

| Raw material | Material -C |
|---|---|
| ZrO$_2$: Manufactured by Solar Co., Ltd., ZR-010 | 2.08 |
| DPHA liquid (dipentaerythritol hexaacrylate: 38%, dipentaerythritol pentaacrylate: 38%, 1-methoxy-2-porpyl acetate: 24%) | 0.29 |
| Urethane-based monomer: UK OLIGO UA-32P, manufactured by Shin-Nakamura Chemical Co., Ltd.: non-volatile content: 75%, 1-methoxy-2-propyl acetate: 25% | 0.14 |
| Monomer mixture (polymerizable compound (b2-1) described in Paragraph [0111] of JP2012-078528A, n = 1: content rate of tripentaerythritol octaacrylate: 85%, total of n = 2 and n = 3 as an impurity is 15%) | 0.36 |
| Polymer solution 1 (Structural Formula P-25 described in Paragraph [0058] of JP2008-146018A: weight-average molecular weight = 35,000, solid content: 45%, 1-methoxy-2-propyl acetate: 15%, 1-methoxy-2-propanol: 40%) | 1.89 |
| Photo-radical polymerization initiator: 2-Benzyl-2-dimethylamino-1-(4-molpholinophenyl)-butanone (Irgacure (registered trademark) 379, manufactured by BASF) | 0.03 |
| Photopolymerization initiator: KAYACURE DETX-S (manufactured by Nippon Kayaku Co., Ltd., alkyl thioxanthone) | 0.03 |
| Polymer solution 2 (polymer having a structural formula represented by Formula (3): a solution having a weight-average molecular weight of 15,000, non-volatile content: 30% by mass, methyl ethyl ketone: 70% by mass) | 0.01 |
| 1-Methoxy-2-propyl acetate | 38.73 |
| Methyl ethyl ketone | 56.80 |
| Total (parts by mass) | 100 |

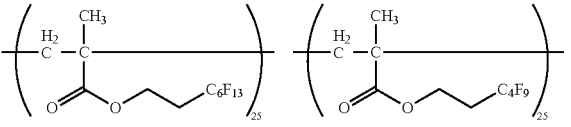

Formula (3) Mw: 15000

<Production of Electrode Pattern-Attached Base Material>

The transparent film-attached base material 10A was introduced into a vacuum chamber, and an ITO thin film (thickness: 40 nm, refractive index: 1.82) was formed on the fifth transparent layer 32 of the transparent film-attached base material 10A by direct current (DC) magnetron sputtering (conditions: the temperature of the transparent film substrate 10 of the transparent film-attached base material 10A: 150° C., argon pressure: 0.13 Pa, and oxygen pressure: 0.01 Pa) using an ITO target (indium:tin=95:5 (molar ratio)) having a SnO$_2$ content ratio of 10% by mass.

Therefore, a base material having the fifth transparent layer 32 and the transparent ITO film laminated on the transparent film substrate 10 was obtained. The surface electrical resistance of the ITO film was 80Ω/□ (Ω per square).

Next, the ITO film was patterned by etching using a well-known chemical etching method. Therefore, an electrode pattern-attached base material having an electrode pattern on the fifth transparent film was produced on the transparent film substrate 10.

Here, the electrode pattern includes a first electrode pattern and a second electrode pattern respectively extending in mutually intersecting directions. As shown in FIG. 1 to FIG. 3, the first electrode pattern has a plurality of first island-shaped electrode portions 12 formed at intervals in a first direction P on the transparent film substrate 10 and first wire portions 16 that electrically connect the first island-shaped electrode portions 12 adjacent to each other. In addition, the second electrode pattern has a plurality of second island-shaped electrode portions 14 formed at intervals in a second direction Q intersecting the first direction P on the transparent film substrate 10.

In examples and comparative examples described below, as shown in Table 4, touch sensors were produced using transfer films for protecting pattern electrodes 1 to 3, transfer films for protecting a bridge wire 1 to 3, and a transfer films for an overcoat.

Examples 1 to 16 and Comparative Examples 1 and 2

<Production of Touch Sensors>
—Production of Transparent Laminate—

The transfer films for protecting pattern electrodes 1 to 3 produced above were prepared.

The protective film of the transfer film for protecting pattern electrodes being used was peeled off, and the peeled surface of the transfer film for protecting pattern electrodes was brought into contact with the transparent film and transparent electrode pattern-formed surface of the electrode pattern-attached base material. In addition, the transfer film for protecting pattern electrodes was laminated on the electrode pattern-attached base material under the following conditions, thereby obtaining a transparent laminate.

<Conditions>
Temperature of transparent film substrate 10: 40° C.
Temperature of rubber roller: 110° C.
Linear pressure: 3 N/cm
Transportation rate: 2 m/min.

Next, the distance between a surface of an exposure mask (mask for forming through-holes) and a surface of the temporary support of the transparent laminate was set to 125 and the transparent laminate was exposed via the temporary support in a pattern shape using a proximity-type stepper having a ultrahigh-pressure mercury lamp (Hitachi High-Tech Electronics Engineering Co., Ltd.) at an exposure amount of an i ray being 100 mJ/cm$^2$.

After that, the temporary support was peeled off from the transparent laminate, and the peeled surface (a surface of the second transparent transfer layer) was washed for 60 seconds using a sodium carbonate 2% by mass aqueous solution (temperature: 32° C.). After the washing, ultrapure water was sprayed to the surface of the second transparent transfer layer from an ultrahigh-pressure washing nozzle, and a residue was removed.

Subsequently, air was blown to the surface of the second transparent transfer layer to remove moisture, and a post baking treatment was carried out at a temperature of 145° C. for 30 minutes.

At this time, as shown in FIG. 1 to FIG. 3, through-holes 20 for connecting the second island-shaped electrode portions 14 and bridge wires (second wire portions) 18 for electrically connecting the second island-shaped electrode portions 14 by building a bridge between two second island-shaped electrode portion 14 adjacent to each other were formed in a first transparent layer 28 and a second transparent layer 30 located on the second island-shaped electrode portions 14 in the second electrode pattern on the transparent film substrate 10.

A transparent laminate having the fifth transparent layer 32, the first electrode pattern and the second electrode pattern, the first transparent layer 28, and the second transparent layer 30 sequentially laminated on the transparent film substrate 10 from the transparent film substrate 10 side was produced in the above-described manner.

Here, the first transparent layer is a cured layer of the first transparent transfer layer in the transfer film for protecting pattern electrodes 1, and the second transparent layer is a cured layer of the second transparent transfer layer in the transfer film for protecting pattern electrodes 1.

—Formation of Bridge Wires (Second Wire Portions)—

Next, a 40 nm-thick ITO film was formed on an entire surface of the transparent laminate on a side provided with the first transparent layer 28, the second transparent layer 30, and the like in the same manner as in the <production of electrode pattern-attached base material>. In addition, the ITO film in regions except for a portion in which bridge wires 18 that connected the second island-shaped electrode portions 14 adjacent to each other were to be formed were removed using a well-known method. The bridge wires (second wire portions) 18 that built bridges so as to extend across the first wire portions and connected two second island-shaped electrode portions 14 adjacent to each other on the first transparent layer 28 and the second transparent layer 30 as shown in FIG. 1 to FIG. 3 were formed in the above-described manner.

—Formation of Transfer Layers for Protecting Bridge Wire—

The transfer films for protecting a bridge wire 1 to 3 produced above were prepared. The protective film of the transfer film for protecting a bridge wire being used was peeled off, and the peeled surface of the transfer film for protecting a bridge wire was brought into contact with a bridge wire-formed surface of an electrode pattern-attached film. In addition, the transfer film for protecting a bridge wire was laminated on the electrode pattern-attached film under the following conditions, thereby producing a laminate body.

<Conditions>
Temperature of transparent film substrate 10: 40° C.
Temperature of rubber roller: 110° C.
Linear pressure: 3 N/cm
Transportation rate: 2 m/min In Example 9, a 20 nm-thick $SiO_2$ layer (low-refractive index layer having a refractive index of 1.46) was deposited on the bridge wire-formed surface of the electrode pattern-attached film by a vacuum deposition method using the protective film 3 of the transfer film for protecting a bridge wire before the transfer of the fourth transparent transfer layer. After that, the $SiO_2$ layer was etched in a pattern using a well-known chemical etching method, thereby forming the $SiO_2$ layer on the bridge wire.

Furthermore, a 10 nm-thick $Nb_2O_5$ layer (high-refractive index layer having a refractive index of 2.33) was deposited on the $SiO_2$ layer-formed surface by the vacuum deposition method. After that, the $Nb_2O_5$ layer was etched in a pattern using the well-known chemical etching method. Therefore, the $SiO_2$ layer and the $Nb_2O_5$ layer were formed on the bridge wire.

Next, as described above, the protective film of the transfer film for protecting a bridge wire 3 was peeled off, and the peeled surface of the transfer film for protecting a bridge wire 3 was brought into contact with the $Nb_2O_5$ layer of the electrode pattern-attached film. In addition, the transfer film for protecting a bridge wire 3 was laminated on the electrode pattern-attached film as described above, thereby producing a laminate body.

After that, the distance between a surface of an exposure mask (silica exposure mask for an overcoat of a wiring pattern) and a surface of the temporary support of the laminate body was set to 125 μm, and the laminate body (specifically, a transfer layer for protecting a bridge wire made up of the third transparent layer and the fourth transparent layer or a transfer layer for protecting a bridge wire made up of the sixth transparent layer, the third transparent layer, and the fourth transparent layer) was exposed through the temporary support to an i ray at an exposure amount of 100 mJ/cm$^2$ in a pattern shape using a proximity-type stepper having a ultrahigh-pressure mercury lamp (Hitachi High-Tech Electronics Engineering Co., Ltd.).

Next, the temporary support was peeled off from the laminate body, and the transfer layer for protecting a bridge wire was transferred onto the electrode pattern-attached film. Therefore, the covering layer 27 that is the transfer layer for protecting a bridge wire is formed on the bridge wire 18 shown in FIG. 3. A surface of the fourth transparent layer that was a peeled surface was washed for 60 seconds in a sodium carbonate 2% by mass aqueous solution (temperature: 32° C.). Ultrapure water was sprayed to the washed surface of the fourth transparent layer from an ultrahigh-pressure washing nozzle, thereby removing a residue.

Subsequently, air was blown to the surface of the fourth transparent layer to remove moisture on the fourth transparent layer, and a post baking treatment was carried out at a temperature of 145° C. for 30 minutes.

In Example 15 and Example 16, the same operation as in Example 1 was carried out except for the fact that, in the above-described <production of transparent film-attached base material> section, the fifth transparent film in which Material-C was used on the cycloolefin resin film was not provided.

The transfer film for an overcoat from which the protective film had been peeled off was prepared, and the transfer film for an overcoat was laminated on the surface of the fourth transparent layer of the laminate body under the following conditions. In addition, the temporary support was peeled off, thereby transferring an overcoat layer to the entire fourth transparent layer 24.

An overcoat layer-attached transparent laminate having the overcoat layer transferred to the surface of the fourth transparent layer of the laminate body was obtained.

<Conditions>
Temperature of transparent film substrate 10: 40° C.
Temperature of rubber roller: 110° C.
Linear pressure: 3 N/cm
Transportation rate: 2 m/min After that, the distance between a surface of an exposure mask (silica exposure mask for an overcoat of a wiring pattern) and a surface of the temporary support was set to 125 μm, and the overcoat layer-attached transparent laminate was exposed via the temporary support in a pattern shape using a proximity-type stepper having a ultrahigh-pressure mercury lamp (Hitachi High-Tech Electronics Engineering Co., Ltd.) at an exposure amount of an i ray being 100 mJ/cm$^2$.

Next, the temporary support was peeled off from the overcoat layer-attached transparent laminate, and the peeled surface (a surface of the overcoat layer) was washed for 60 seconds using a sodium carbonate 2% by mass aqueous solution (temperature: 32° C.). Ultrapure water was sprayed to the washed surface of the overcoat layer from an ultra-high-pressure washing nozzle, thereby removing a residue.

Subsequently, air was blown to the surface of the overcoat layer, moisture on the overcoat layer was removed, and then a post baking treatment was carried out at a temperature of 145° C. for 30 minutes.

A touch sensor having a laminate structure shown in FIG. 3 was produced in the above-described manner.

<Evaluation 1>

For the touch sensors produced in the above-described manner, the following measurement and evaluation were carried out. Evaluation results are shown in Table 4.

(1) Electrode Pattern-Covering Property

For the touch sensor having the structure shown in FIG. 3 that was produced in each of the examples and the comparative examples, a black polyethylene terephthalate (PET) material was attached to a surface of the transparent film substrate 10 using transparent adhesive tape (trade name: OCA TAPE 8171CL, manufactured by 3M), thereby blocking the entire surface of the transparent film substrate 10 from light.

Subsequently, the touch sensor was placed in a dark room, light of a fluorescent lamp was radiated from an overcoat layer side of the touch sensor (a side opposite to the side on which the black PET material was attached), reflected light reflected toward the overcoat layer side was visually observed in an oblique direction which was an acute angle direction with respect to the normal direction of the overcoat layer. At this time, the appearance of the electrode pattern being observed was evaluated according to the following evaluation standards.

Regarding the evaluation, A, B, and C are in a practically permissible range, A and B are preferred, and A is more preferred.

<Evaluation Standards>

A: The bridge wire is not visible even in the case of being carefully observed from a location 10 cm apart from the touch sensor, and the bridge wire is still invisible even in the case of being observed from a location 30 cm apart from the touch sensor.

B: The bridge wire is slightly visible in the case of being carefully observed from a location 10 cm apart from the touch sensor, but the bridge wire is not visible in the case of being observed from a location 30 cm apart from the touch sensor.

C: The bridge wire is slightly visible in the case of being carefully observed from a location 10 cm apart from the touch sensor, and the bridge wire is slightly visible even in the case of being observed from a location 30 cm apart from the touch sensor.

D: The bridge wire is clearly visible in the case of being carefully observed from a location 10 cm apart from the touch sensor, and the bridge wire is slightly visible even in the case of being observed from a location 30 cm apart from the touch sensor.

E: The bridge wire is clearly visible in the case of being carefully observed from a location 10 cm apart from the touch sensor, and the bridge wire is clearly visible even in the case of being observed from a location 30 cm apart from the touch sensor.

(2) Reflectivity of Electrode Pattern

For the touch sensors having the structure shown in FIG. 3 which were respectively produced in the examples and the comparative examples, the reflectivity of the respective touch sensors against a D65 light source was measured using a spectrophotometer V-570 (manufactured by JASCO Corporation).

TABLE 4

| | Seventh transparent layer | | | First transparent layer | | | Second transparent layer | | | Refractive index difference (*1) | Sixth transparent layer | | |
|---|---|---|---|---|---|---|---|---|---|---|---|---|---|
| | Material | Refractive index | Thickness | Material | Refractive index | Thickness | Material | Refractive index | Thickness | | Material | Refractive index | Thickness |
| Example 1 | — | | | Material B-1 | 1.68 | 70 nm | Material A-1 | 1.51 | 3 μm | 0.17 | — | | |
| Example 2 | — | | | Material B-1 | 1.68 | 70 nm | Material A-1 | 1.51 | 3 μm | 0.17 | — | | |
| Example 3 | — | | | Material B-1 | 1.68 | 70 nm | Material A-1 | 1.51 | 3 μm | 0.17 | — | | |
| Example 4 | — | | | Material B-1 | 1.68 | 70 nm | Material A-1 | 1.51 | 3 μm | 0.17 | — | | |
| Example 5 | — | | | Material B-1 | 1.68 | 70 nm | Material A-1 | 1.51 | 3 μm | 0.17 | — | | |
| Example 6 | — | | | Material B-1 | 1.68 | 70 nm | Material A-1 | 1.51 | 3 μm | 0.17 | — | | |
| Example 7 | — | | | Material B-1 | 1.68 | 70 nm | Material A-1 | 1.51 | 3 μm | 0.17 | — | | |
| Example 8 | — | | | Material B-1 | 1.68 | 70 nm | Material A-1 | 1.51 | 3 μm | 0.17 | Material B-3 | 1.48 | 17 nm |
| Example 9 | — | | | Material B-1 | 1.68 | 70 nm | Material A-1 | 1.51 | 3 μm | 0.17 | Deposited (SiO$_2$) | 1.46 | 20 nm |

TABLE 4-continued

| | | | | | | | | | | | | |
|---|---|---|---|---|---|---|---|---|---|---|---|---|
| Example 10 | — | | Material B-1 | 1.68 | 70 nm | Material A-1 | 1.51 | 3 μm | 0.17 | Material B-3 | 1.48 | 17 nm |
| Example 11 | — | | Material B-1 | 1.68 | 70 nm | Material A-1 | 1.51 | 3 μm | 0.17 | Material B-3 | 1.48 | 17 nm |
| Example 12 | — | | Material B-1 | 1.68 | 70 nm | Material A-2 | 1.55 | 3 μm | 0.13 | Material B-3 | 1.48 | 17 nm |
| Example 13 | — | | Material B-1 | 1.68 | 70 nm | Material A-4 | 1.46 | 3 μm | 0.22 | Material B-3 | 1.48 | 17 nm |
| Example 14 | Material B-3 | 1.48 | 33 nm Material B-4 | 1.70 | 35 nm | Material A-1 | 1.51 | 3 μm | 0.19 | Material B-3 | 1.48 | 17 nm |
| Example 15 | — | | Material B-1 | 1.68 | 70 nm | Material A-1 | 1.51 | 3 μm | 0.17 | — | | |
| Example 16 | — | | — | | | Material A-1 | 1.51 | 3 μm | — | | | |
| Comparative Example 1 | — | | — | | | Material A-1 | 1.51 | 3 μm | — | | | |
| Comparative Example 2 | — | | Material B-1 | 1.68 | 70 nm | Material A-1 | 1.51 | 3 μm | 0.17 | — | | |

| | Third transparent layer | | | Fourth transparent layer | | | Refractive index difference (*2) | Fifth transparent layer | | | Evaluation | |
|---|---|---|---|---|---|---|---|---|---|---|---|---|
| | Material | Refractive index | Thickness | Material | Refractive index | Thickness | | Material | Refractive index | Thickness | Reflectivity | Covering property |
| Example 1 | Material B-2 | 1.62 | 60 nm | Material A-1 | 1.51 | 5 μm | 0.11 | Material C | 1.63 | 80 nm | 1.40% | B |
| Example 2 | Material B-2 | 1.62 | 220 nm | Material A-1 | 1.51 | 5 μm | 0.11 | Material C | 1.63 | 80 nm | 1.40% | C |
| Example 3 | Material B-2 | 1.62 | 60 nm | Material A-1 | 1.51 | 1 μm | 0.11 | Material C | 1.63 | 80 nm | 1.40% | B |
| Example 4 | Material B-4 | 1.70 | 70 nm | Material A-1 | 1.51 | 5 μm | 0.19 | Material C | 1.63 | 80 nm | 1.40% | B |
| Example 5 | Material B-2 | 1.62 | 60 nm | Material A-2 | 1.55 | 5 μm | 0.07 | Material C | 1.63 | 80 nm | 1.40% | B |
| Example 6 | Material B-2 | 1.62 | 60 nm | Material A-3 | 1.60 | 5 μm | 0.02 | Material C | 1.63 | 80 nm | 1.50% | C |
| Example 7 | Material B-2 | 1.62 | 60 nm | Material A-4 | 1.46 | 5 μm | 0.16 | Material C | 1.63 | 80 nm | 1.40% | B |
| Example 8 | Material B-4 | 1.70 | 30 nm | Material A-1 | 1.51 | 5 μm | 0.19 | Material C | 1.63 | 80 nm | 1.40% | A |
| Example 9 | Deposited (Nb$_2$O$_5$) | 2.33 | 10 nm | Material A-1 | 1.51 | 5 μm | 0.82 | Material C | 1.63 | 80 nm | 1.40% | A |
| Example 10 | Material B-2 | 1.62 | 60 nm | Material A-2 | 1.55 | 5 μm | 0.07 | Material C | 1.63 | 80 nm | 1.40% | A |
| Example 11 | Material B-2 | 1.62 | 60 nm | Material A-4 | 1.46 | 5 μm | 0.16 | Material C | 1.63 | 80 nm | 1.40% | A |
| Example 12 | Material B-4 | 1.70 | 30 nm | Material A-1 | 1.51 | 5 μm | 0.19 | Material C | 1.63 | 80 nm | 1.40% | A |
| Example 13 | Material B-4 | 1.70 | 30 nm | Material A-1 | 1.51 | 5 μm | 0.19 | Material C | 1.63 | 80 nm | 1.40% | A |
| Example 14 | Material B-4 | 1.70 | 30 nm | Material A-1 | 1.51 | 5 μm | 0.19 | Material C | 1.63 | 80 nm | 1.00% | A |
| Example 15 | Material B-2 | 1.62 | 60 nm | Material A-1 | 1.51 | 5 μm | 0.11 | — | | | 1.90% | B |
| Example 16 | Material B-2 | 1.62 | 60 nm | Material A-1 | 1.51 | 5 μm | 0.11 | — | | | 3.50% | C |
| Comparative Example 1 | — | | | Material A-1 | 1.51 | 5 μm | — | — | | | 4.00% | E |
| Comparative Example 2 | Material B-3 | 1.48 | 60 nm | Material A-3 | 1.60 | 5 μm | −0.12 | Material C | 1.63 | 80 nm | 2.00% | E |

(*1): Refractive index difference obtained by subtracting the refractive index of the second transparent layer from the refractive index of the first transparent layer
(*2): Refractive index difference obtained by subtracting the refractive index of the fourth transparent layer from the refractive index of the third transparent layer As shown in Table 4, in Examples 1 to 16, the reflectivity in the electrode patterns was decreased, the bridge wire which was particularly easily visible was also covered, and the touch sensors were more favorable in terms of the appearance.

Among the examples, compared with Examples 1 to 7 in which the covering layer disposed on the bridge wire was made up of two layers of the third transparent layer and the fourth transparent layer, in Examples 8 to 14 in which the covering layer disposed on the bridge wire was made up of three layers of the sixth transparent layer, the third transparent layer, and the fourth transparent layer, the covering property for the bridge wire was strong, and the visibility of the electrode patterns including the bridge wire was further improved.

In addition, in Example 1 in which the thickness of the third transparent layer was 60 nm, it is found that the visibility of the bridge wire was further improved compared with Example 2 in which the third transparent layer was thickened. Regarding the particles used in the third transparent layer, in Example 1 in which $ZrO_2$ was used and Example 4 in which the refractive index was set to 1.7 using $TiO_2$, the reflectivity was suppressed to be low in both examples, and the visibility of the bridge wire was also excellent.

From the results of Examples 5 to 7 in which the refractive index was changed relative to Example 1 by adding the particles to the fourth transparent layer, it was found that the reflectivity could be suppressed by setting the refractive index of the fourth transparent layer to 1.6 or less, and consequently, the visibility of the bridge wire could be improved.

Next, in Example 8 in which the sixth transparent layer having a lower refractive index than the third transparent layer was provided on the bridge wire and the covering layer made up of three layers was provided on the bridge wire as described above, it is found that the visibility of the bridge wire was further improved compared with Example 4. This fact was also true in a case where the third transparent layer and the sixth transparent layer were formed of a deposited film as in Example 9. In Example 9, the refractive index of the third transparent layer was increased up to 2.33, but the preferred range (1.5 to 2.4) of the refractive index in a case where the covering layer has a three-layer structure is different from that in the case of a two-layer structure, and, thus, similar to Example 8, the visibility of the bridge wire was further improved compared with Example 4.

In addition, also in Examples 10 and 11 in which the sixth transparent layer having a lower refractive index than the third transparent layer was provided on the bridge wire and the covering layer made up of three layers was provided on the bridge wire, it was found that, similarly, the visibility of the bridge wire was further improved in the respective cases relative to Examples 5 and 7.

In the comparison with Example 8, in Examples 12 and 13 in which the refractive index was changed by including the particles in the second transparent layer, the refractive index was in the preferred range of the refractive index (1.4 or higher and less than 1.6) of the second transparent layer, and the reflectivity and the covering property were equal to those in Example 8.

In addition, in Example 14, the particles in the first transparent layer of Example 8 was changed to $TiO_2$ particles, and, furthermore, the seventh transparent layer was additionally provided, whereby the refractive index of the first transparent layer was increased to be in the preferred range, and a layer having a lower refractive index than the first transparent layer was superimposed on the first transparent layer in the structure. Therefore, the reflectivity was suppressed to be lower, which was advantageous in terms of improvement in the visibility of the bridge wire.

Comparison between Example 1 and Example 15 shows that, in the case of forming a structure in which the first electrode pattern and the second electrode pattern was sandwiched between the protective layers (the first transparent layer and the second transparent layer) and the fifth transparent layer, the reflectivity was suppressed to be lower.

In addition, from the comparison between Example 15 and Example 16, it was found that, in the case of forming a structure in which, in addition to the second transparent layer, the first transparent layer was further provided, the reflectivity was suppressed to be low, and the effect for improving the visibility of the bridge wire was also obtained.

On the other hand, in Comparative Example 1 in which the third transparent layer was not provided and only the fourth transparent layer was disposed, the reflectivity was high, and the bridge wire-covering property was significantly poor. In addition, in Comparative Example 2 in which the refractive index of the third transparent layer was lower than the refractive index of the fourth transparent layer, the reflectivity was favorable compared with that of Comparative Example 1, but was higher than those of the respective examples, and the bridge wire-covering property was also significantly poorer than those of the respective examples.

<Production of Image Display Device (Touch Panel)>

The touch sensor having the structure shown in FIG. 3 that was produced in each of the examples and the comparative examples was attached to a liquid crystal display element manufactured using a method described in Paragraphs 0097 to 0119 of JP2009-047936A, and, furthermore, a front surface glass was attached thereto, thereby producing an image display device including the touch sensor that is an electrostatic capacitance-type input device using a well-known method.

<Evaluation 2>

In the touch sensor in the image display device, the electrode pattern was not visible. In addition, there was no defect such as air bubbles in the touch sensor, and the display characteristic was excellent.

EXPLANATION OF REFERENCES

10: transparent film substrate
10A: transparent film-attached base material
12: first island-shaped electrode portion
14: second island-shaped electrode portion
16: first wire portion
18: second wire portion (bridge wire)
20: through-hole
22, 122: third transparent layer
24, 124, 224: fourth transparent layer
26, 126: sixth transparent layer
27: covering layer
28: first transparent layer
30: second transparent layer
32: fifth transparent layer
34: first electrode pattern
36: second electrode pattern
40: overcoat layer
42: seventh transparent layer
100, 200, 300, 400: touch sensor
P: first direction (arrangement direction of plurality of first island-shaped electrode portions)
Q: second direction (arrangement direction of plurality of second island-shaped electrode portions)

What is claimed is:
1. A touch sensor comprising:
a first electrode pattern and a second electrode pattern respectively extending in mutually intersecting directions on a same surface of a transparent base material, a protective layer having a first transparent layer and a second transparent layer, a third transparent layer,
a fourth transparent layer,
wherein the first electrode pattern has a plurality of first island-shaped electrode portions disposed at intervals in a first direction on the transparent base material and first wire portions that electrically connect the first island-shaped electrode portions adjacent to each other,
the second electrode pattern has a plurality of second island-shaped electrode portions disposed at intervals in a second direction intersecting the first direction and second wire portions that build bridges and electrically connect the second island-shaped electrode portions adjacent to each other on the transparent base material,
the third transparent layer being disposed on each of the second wire portions, and the fourth transparent layer being disposed on the third transparent layer,
the third transparent layer has a refractive index p of 1.5 or higher and a thickness of 300 nm or less and the fourth transparent layer has a refractive index lower than the refractive index p and a thickness of 0.5 μm or more are provided,
the protective layer is provided on the first electrode pattern and the second island-shaped electrode portions of the second electrode pattern, and
the first electrode pattern and the second island-shaped electrode portions of the second electrode pattern, and the first transparent layer being disposed on the transparent base material, and the second transparent layer being disposed on the first transparent layer,
the first transparent layer has a refractive index of 1.6 or higher and a thickness of 200 nm or less and the second transparent layer has a refractive index of less than 1.6 and a thickness of 0.5 μm or more.

2. The touch sensor according to claim 1,
wherein the refractive index of the third transparent layer is higher than the refractive index of the fourth transparent layer by 0.01 or more.

3. The touch sensor according to claim 1,
wherein each of the second wire portions is a transparent electrode.

4. The touch sensor according to claim 1,
wherein the refractive index of the first transparent layer is 0.01 or more higher than the refractive index of the second transparent layer.

5. The touch sensor according to claim 1,
wherein the protective layer has through-holes, and
the second wire portions electrically connect the plurality of second island-shaped electrode portions adjacent to each other via the through-holes.

6. The touch sensor according to claim 1,
wherein the first transparent layer, the second transparent layer, the third transparent layer, and the fourth transparent layer are transfer layers.

7. The touch sensor according to claim 1,
wherein the first transparent layer has a refractive index of 1.6 to 1.9 and a thickness of 20 nm to 200 nm, and
the second transparent layer has a refractive index of 1.4 or higher and less than 1.6 and a thickness of 0.5 μm to 20 μm.

8. The touch sensor according to claim 1, further comprising:
a seventh transparent layer having a refractive index of 1.5 or less and a thickness of 200 nm or less between the first transparent layer and the first electrode pattern and the second electrode pattern.

9. The touch sensor according to claim 1, further comprising:
a sixth transparent layer having a thickness of 200 nm or less between each of the second wire portions and the third transparent layer,
wherein a refractive index of the sixth transparent layer is lower than the refractive index of the third transparent layer.

10. The touch sensor according to claim 9,
wherein the refractive index p of the sixth transparent layer is 1.6 or less.

11. The touch sensor according to claim 9,
wherein the third transparent layer has a refractive index of 1.5 to 2.4 and a thickness of 10 nm to 100 nm,
the fourth transparent layer has a refractive index of 1.4 to 1.6 and a thickness of 0.5 μm to 20 μm, and
the sixth transparent layer has a refractive index of 1.2 to 1.6 and a thickness of 10 nm to 100 nm.

12. The touch sensor according to claim 9,
wherein the sixth transparent layer is a transfer layer.

13. The touch sensor according to claim 1,
wherein the third transparent layer has a refractive index of 1.5 to 1.75 and a thickness of 20 nm to 300 nm, and
the fourth transparent layer has a refractive index of 1.4 to 1.6 and a thickness of 0.5 μm to 20 μm.

14. An image display device comprising:
the touch sensor according to claim 1.

15. A touch sensor comprising:
a first electrode pattern and a second electrode pattern respectively extending in mutually intersecting directions on a same surface of a transparent base material,
wherein the first electrode pattern has a plurality of first island-shaped electrode portions disposed at intervals in a first direction on the transparent base material and first wire portions that electrically connect the first island-shaped electrode portions adjacent to each other,
the second electrode pattern has a plurality of second island-shaped electrode portions disposed at intervals in a second direction intersecting the first direction and second wire portions that build bridges and electrically connect the second island-shaped electrode portions adjacent to each other on the transparent base material, and
a third transparent layer having a refractive index p of 1.5 or higher and a thickness of 300 nm or less and a fourth transparent layer having a refractive index lower than the refractive index p and a thickness of 0.5 μm or more are provided on the second wire portions, the third transparent layer is disposed on the second wire portions, and the fourth transparent layer is disposed on the third transparent layer,
further comprising:
a fifth transparent layer having a refractive index of 1.6 or higher and a thickness of 200 nm or less between the transparent base material and the first electrode patterns and the second electrode pattern.

16. A method for manufacturing the touch sensor comprising a following order:
forming a first transparent layer on electrode pattern-attached base material by transferring a transfer layer of a transfer material,
forming a second transparent layer on the electrode pattern-attached base material by transferring a transfer layer of a transfer material,
forming a third transparent layer on second wire portions that are on a second electrode pattern of the electrode pattern-attached base material including a first electrode pattern and the second electrode pattern respectively extending in mutually intersecting directions on a same surface of a transparent base material; and forming a fourth transparent layer on the third transparent layer by transferring a transfer layer of a transfer material, wherein the first transparent layer has a refractive index of 1.6 or higher and a thickness of 200 nm or less, the second transparent layer has a refractive index of less than 1.6 and a thickness of 0.5 μm or more, the third transparent layer has a refractive index p of 1.5 or higher and a thickness of 300 nm or less by transferring a transfer layer of a transfer material, and the fourth transparent layer has a refractive index lower than the refractive index p and a thickness of 0.5 μm or more.

17. The method for manufacturing the touch sensor according to claim 16 comprising:

forming a sixth transparent layer on each of the second wire portions by transferring a transfer layer of a transfer material before the formation of the third transparent layer, wherein the sixth transparent layer having a thickness of 200 nm or less and a refractive index lower than the refractive index of the third transparent layer.

18. The method for manufacturing the touch sensor according to claim 17, wherein the refractive index p of the third transparent layer is 1.6 or less.

* * * * *